United States Patent
Kobayashi

(10) Patent No.: US 12,392,998 B2
(45) Date of Patent: Aug. 19, 2025

(54) OPTICAL SYSTEM AND IMAGE PICKUP APPARATUS

(71) Applicant: CANON KABUSHIKI KAISHA, Tokyo (JP)

(72) Inventor: Mikio Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 386 days.

(21) Appl. No.: 18/175,569

(22) Filed: Feb. 28, 2023

(65) Prior Publication Data

US 2023/0288665 A1    Sep. 14, 2023

(30) Foreign Application Priority Data

Mar. 11, 2022   (JP) ................. 2022-038524

(51) Int. Cl.
   *G02B 13/00*   (2006.01)
   *G02B 9/12*    (2006.01)

(52) U.S. Cl.
   CPC ........... *G02B 13/006* (2013.01); *G02B 9/12* (2013.01)

(58) Field of Classification Search
   CPC .............................. G02B 13/006; G02B 9/12
   USPC ........................................................ 359/784
   See application file for complete search history.

(56) References Cited

U.S. PATENT DOCUMENTS

| | | | |
|---|---|---|---|
| 9,798,115 | B1 | 10/2017 | Yin |
| 10,890,698 | B2 | 1/2021 | Kobayashi |
| 2017/0146215 | A1* | 5/2017 | Lin ............. G02B 19/0014 |
| 2022/0221687 | A1 | 7/2022 | Ito et al. |
| 2022/0221690 | A1 | 7/2022 | Kobayashi |

FOREIGN PATENT DOCUMENTS

JP    5434457 B2    3/2014

* cited by examiner

*Primary Examiner* — George G. King

(74) *Attorney, Agent, or Firm* — Carter, DeLuca & Farrell LLP

(57) ABSTRACT

An optical system includes first to third units. The first unit includes a first substrate and a first lens having negative refractive power. The first lens is disposed on the image side of the first substrate. The second unit includes a second substrate and a second lens having positive refractive power. The second lens is disposed on the object side or image side of the second substrate. The third unit includes a third substrate and a third lens having positive refractive power. The third lens is disposed on the object side or image side of the third substrate. At least one of the first to third lenses constitutes a cemented lens including a fourth lens. The fourth lens and the lens cemented with the fourth lens in the cemented lens have refractive powers different from each other and Abbe numbers different from each other.

20 Claims, 11 Drawing Sheets

OPTICAL SYSTEM AND IMAGE PICKUP APPARATUS

BACKGROUND

Technical Field

One of the aspects of the disclosure relates to an optical system and an image pickup apparatus.

Description of the Related Art

An optical system for an image pickup apparatus such as a medical endoscope and a mobile phone has recently been demanded to be small and have high optical performance. U.S. Pat. No. 9,798,115 and Japanese Patent No. 5434457 each disclose a wafer level lens (wafer level optics), which is an optical system manufactured by a wafer level process.

The configuration disclosed in U.S. Pat. No. 9,798,115 cannot sufficiently reduce a variety of aberrations, and thus has difficulty in realizing an optical system having high optical performance. The configuration disclosed in Japanese Patent No. 5434457 has so many lenses that it is difficult to realize a small wafer level lens.

SUMMARY

One of the aspects of the embodiment provides an optical system that can be small and have high optical performance.

An optical system according to one aspect of the disclosure includes a plurality of units. The plurality of units consists of, in order from an object side to an image side, a first unit, a second unit, and a third unit. The first unit includes a first substrate and a first lens having negative refractive power. The first lens is disposed on the image side of the first substrate. The second unit includes a second substrate and a second lens having positive refractive power. The second lens is disposed on the object side or image side of the second substrate. The third unit includes a third substrate and a third lens having positive refractive power. The third lens is disposed on the object side or image side of the third substrate. At least one of the first lens, the second lens, and the third lens constitutes a cemented lens including a fourth lens. The fourth lens and the lens cemented with the fourth lens in the cemented lens have refractive powers different from each other and Abbe numbers different from each other. An image pickup apparatus having the above optical system also constitutes another aspect of the disclosure.

Further features of the disclosure will become apparent from the following description of embodiments with reference to the attached drawings.

DESCRIPTION OF THE EMBODIMENTS

Figure 1:
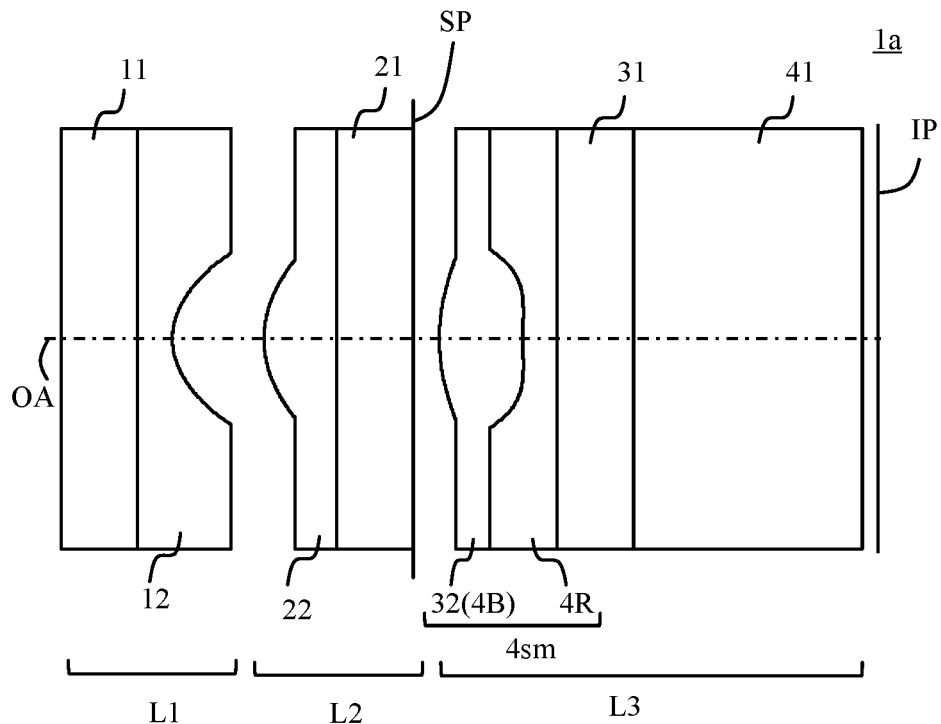
FIG. 1 is a sectional view of an optical system according to Example 1.

Referring now to the accompanying drawings, a detailed description will be given of embodiments according to the disclosure.

An optical system according to each example is a small optical system obtained using the technique called wafer level process. This optical system is called a wafer level lens (wafer level optics), and an image pickup apparatus using the wafer level lens as an imaging optical system is called a wafer level camera. The optical system according to each example is suitable for use as an optical system for a built-in camera in an electronic apparatus, such as a mobile phone, a smartphone, and a wearable terminal, and as an objective optical system for an endoscope, due to its characteristics of a small size and low cost.

FIGS. 1, 3, 5, 7, 9, 11, 13, 15, 17, and 19 are sectional views of optical systems (wafer level lenses) 1a, 1b, 1b, 1c, 1d, 1e, 1f, 1g, 1h, 1i, and 1j according to Examples 1 to 10, respectively. In each sectional view, a left side is an object side (front side) and a right side is an image side (rear side). SP denotes an aperture stop (diaphragm) and IP denotes an image plane. An imaging plane of a solid-state image sensor such as a CCD sensor or a CMOS sensor in an image pickup apparatus and a photosensitive plane corresponding to a film plane of a film-based camera are disposed on the image plane IP.

FIGS. 2A to 2D, 4A to 4D, 6A to 6D, 8A to 8D, 10A to 10D, 12A to 12D, 14A to 14D, 16A to 16D, 18A to 18D, and 20A to 20D are aberration diagrams of the optical systems 1a, 1b, 1c, 1d, 1e, 1f, 1g, 1h, 1i and 1j according to Examples 1 to 10, respectively. FIGS. 2A, 4A, 6A, 8A, 10A, 12A, 14A, 16A, 18A, and 20A are spherical aberration diagrams. FIGS. 2B, 4B, 6B, 8B, 10B, 12B, 14B, 16B, 18B, and 20B are astigmatism diagrams. FIGS. 2C, 4C, 6C, 8C, 10C, 12C, 14C, 16C, 18C, and 20C are distortion diagrams. FIGS. 2D, 4D, 6D, 8D, 10D, 12D, 14D, 16D, 18D, and 20D are lateral chromatic aberration diagrams. Each spherical aberration diagram illustrates spherical aberration amounts for the d-line (wavelength 587.6 nm), the g-line (wavelength 435.8 nm), the C-line (wavelength 656.3 nm), and the F-line (wavelength 486.1 nm). In each astigmatism diagram, ΔSd indicates an astigmatism amount on a sagittal image plane for the d-line, and ΔMd indicates an astigmatism amount on a meridional image plane for the d-line. Each distortion diagram illustrates a distortion amount for the d-line. Each lateral chromatic aberration diagram illustrates chromatic aberration amounts for the g-line, C-line, and F-line. Fno denotes an F-number and Y denotes an image height (mm).

The optical system according to each example includes a plurality of units. The plurality of units consist of, in order from the object side to the image side, a first unit L1, a second unit L2, and a third unit L3. The first unit L1 includes a first substrate 11 and a first lens 12 having negative refractive power and disposed on the image side of the first substrate 11. The second unit L2 includes a second substrate 21 and a second lens 22 having positive refractive power and disposed on the object side or image side of the second substrate 21. The third unit L3 includes a third substrate 31 and a third lens 32 having positive refractive power and disposed on the object side or image side of the third substrate 31. At least one of the first lens 12, the second lens 22, and the third lens 32 is cemented with a fourth lens 4R to form a cemented lens 4sm. The refractive powers of the fourth lens 4R and the lens cemented with the fourth lens 4R (fifth lens 4B) are different from each other and the Abbe numbers (of their materials) of the fourth lens 4R and the lens cemented with the fourth lens 4R are different from each other.

The cemented lens 4sm is disposed in close contact with any one of the first substrate 11, the second substrate 21, or the third substrate 31. The first substrate 11 is a planar substrate and the first lens 12 is a concave lens. The first lens 12 is formed on a surface on the image side of the first substrate 11 using the wafer level process. A surface on the image side of the first lens 12 is aspheric. The second substrate 21 is a planar substrate, and the second lens 22 is a convex lens. The second lens 22 is formed on the object side or image side of the second substrate 21 using the wafer level process. The surface of the second lens 22 opposite to the second substrate 21 is aspheric. The third substrate 31 is a planar substrate and the third lens 32 is a convex lens. The third lens 32 is formed on the object side or image side of the third substrate 31 using the wafer level process. A surface of the third lens 32 opposite to the third substrate 31 is aspheric.

The cemented lens 4sm is formed on at least one of the first substrate 11, the second substrate 21, and the third substrate 31 using the wafer level process. More specifically, first, one lens (fourth lens 4R or fifth lens 4B) constituting the cemented lens 4sm is formed on any one of first substrate 11, second substrate 21, and third substrate 31. Thereafter, the other lens (the fifth lens 4B or the fourth lens 4R) is formed with a different material by the wafer level process.

In at least one lens of the cemented lens 4sm, one surface closely contacts the substrate and thus has a planar shape. The remaining two surfaces of the cemented lens 4sm may be aspheric. In forming a lens on each substrate, the lens may be formed only on a single side of the substrate. For example, in forming a lens on a thin substrate, the lens shape can be formed with high accuracy a support material on a flat plate is adhered to one side of the substrate to prevent the substrate from bending, and then the lens is formed on the other side. However, in a case where lenses are formed on both sides of the substrate, the support material cannot be adhered, and it becomes difficult to make the lens shape with high accuracy. In using a wafer level optics as a small image pickup apparatus such as an endoscope or a smartphone, a surface closest to the object may be made of a material such as a glass material that is hard and highly resistant to the environment.

In forming a lens by the wafer level process, it is less expensive to make the lens of a resin material. If the lens surface is located on the object side, a structure with excellent environmental resistance cannot be achieved. Since it is difficult to make the surface of the glass material curved in the wafer level process, a flat surface of the substrate glass disposed closest to the object can provide the wafer level optics with excellent environmental resistance.

In the optical system according to each example, the first unit L1, the second unit L2, and the third unit L3 are manufactured using the wafer level process in order to achieve a small and low-cost optical system. That is, the first unit L1, the second unit L2, and the third unit L3 are manufactured by forming a lens layer made of a wafer level lens on a wafer (planar substrate) made of a glass material. In each example, the materials of the first substrate 11 and the first lens 12 are different from each other. The materials of the second substrate 21 and the second lens 22 are different from each other, and the materials of the third substrate 31 and the third lens 32 are different from each other.

In the second unit L2 or the third unit L3, an aperture stop SP is formed on the substrate by a similar wafer process. The first unit L1, the second unit L2, the third unit L3, and the image sensor thus manufactured are disposed at a desired interval, adhered in an area outside a ray effective area, etc., and then cut. Thereby, a large number of wafer level lenses can be manufactured. As long as the material for forming the lens layer is a wafer level lens, either a thermoplastic resin or an ultraviolet curable resin may be used. Another example includes acrylic resins, silicone resins, and cycloolefin polymers.

In each example, the first substrate 11, the second substrate 21, and the third substrate 31 are each made of glass, and the first lens 12, the second lens 22, and the third lens 32 are each made of resin. However, the materials are not limited to this example. As long as the first substrate 11 and the first lens 12 have different refractive indices, for example, both the first substrate 11 and the first lens 12 may be made of resin. This point can be similarly applied to the second unit L2 and the third unit L3. The aperture stop SP can be formed by vapor-depositing a light shielding film such as chromium using a mask, or by forming an opening by etching after vapor deposition. At that time, forming the aperture stop SP on a plane such as a substrate facilitates control of the mask arrangement in the thickness direction, and is beneficial in terms of manufacturing.

The optical system according to each example is an optical system in which the first unit L1, the second unit L2, and the third unit L3 are integrated. The optical system according to each example and the fourth substrate (sensor cover glass) 41 or the fifth substrate (sensor cover glass) 51 are cemented to serve as an imaging system. A back cover glass (third substrate 31 or fourth substrate 41) is provided on a surface closest to the image plane in the optical system according to each example. Directly joining the back cover glass (third substrate 31 or fourth substrate 41) and the sensor cover glass (fourth substrate 41 or fifth substrate 51) via the plane can achieve a stable manufacturing process. This configuration can provide a small optical system with high optical performance, in which the costs of materials and manufacturing processes are suppressed (that is, at low cost).

In each example, the optical system includes both the back cover glass (third substrate 31 or fourth substrate 41) and the sensor cover glass (fourth substrate 41 or fifth substrate 51), but is not limited to this example. For example, a single substrate may have a combined function of the sensor cover glass and the back cover glass. In that case, directly adhering the sensor cover glass and the wafer-level optical system can suppress the thickness of the substrate, and thus can provide a small and high-performance optical system.

The wafer level lens as in the optical system according to each example may be a smaller optical system. In making small an extremely wide-angle optical system with a half angle of view of 50° or more as in each example, it is important to reduce the number of lenses and the number of substrates as small as possible. In the wide-angle wafer-level optics with a small number of lenses, such as four lenses, as in each example, a variety of aberrations can be satisfactorily corrected by placing a lens made of a low-dispersion material at a certain distance from the aperture stop. However, there are few reflowable low-dispersion resin materials, and it is difficult to correct a variety of aberrations (especially lateral chromatic aberration) with a small number of lenses. Lens with different Abbe numbers can be added to the existing wafer level optics to correct chromatic aberration. However, a lens may be held by a substrate in the wafer level optics, and a single side of the lens becomes planar, and it becomes difficult to correct a variety of aberrations such as curvature of field and chromatic aberration in a well-balanced manner.

Accordingly, in the optical system according to each example, chromatic aberration, curvature of field, and the like are effectively corrected by arranging two lenses having different dispersions close to each other. In particular, spherical (especially aspherical) surfaces on both sides of one lens can independently correct a light beam at each image height, and a variety of aberrations can be satisfactorily corrected over the entire image plane.

The optical system according to each example may satisfy the following inequality (1):

$$8<|vr-vb|<60 \tag{1}$$

where vr and vb are Abbe numbers of the fourth lens 4R and the fifth lens 4B of the cemented lens 4sm.

In a case where the value is lower than the lower limit of inequality (1), a sufficient chromatic aberration correcting effect cannot be obtained. In a case where the value is higher than the upper limit of inequality (1), it becomes difficult to select a lens material, the lens material becomes expensive, or it becomes difficult to control the reflow process.

Inequality (1) may be replaced with the following inequality (1a):

$$10<|vr-vb|<45 \tag{1a}$$

Inequality (1) may be replaced with the following inequality (1b):

$$11<|vr-vb|<40 \tag{1b}$$

In the optical system according to each example, the aperture stop SP is disposed in the middle part of the optical system, that is, between the lens closest to the object and the lens closest to the image plane. This configuration can separate light beams at respective image heights incident on the lens on the object side and the lens on the image side, and satisfactorily correct the lateral chromatic aberration. More specifically, the aperture stop SP may be disposed on the second substrate 21 or the third substrate 31. Thereby, a variety of aberrations can be satisfactorily corrected and the aperture stop can be formed on a plane, so that the optical system can be manufactured at low cost.

In the optical system according to each example, use of the cemented lens 4sm can satisfactorily correct mainly the lateral chromatic aberration. In order to satisfactorily correct the lateral chromatic aberration, the cemented lens 4sm may be disposed at a certain distance from the aperture stop SP. Accordingly, the following inequality (2) may be satisfied:

$$0.05<dsm/f<2.50 \tag{2}$$

where dsm is a distance on the optical axis from the cemented surface of the cemented lens 4sm to the aperture stop SP, and f is a focal length of the optical system (entire system).

In a case where the value is higher than the upper limit or lower than lower limit of inequality (2), it becomes difficult to satisfactorily correct the chromatic aberration of the optical system.

Inequality (2) may be replaced with inequality (2a) below:

$$0.10<dsm/f<2.20 \tag{2a}$$

Inequality (2) may be replaced with inequality (2b) below:

$$0.12<dsm/f<1.90 \tag{2b}$$

In order to correct the lateral chromatic aberration and a variety of aberrations in a well-balanced manner, the refractive power at the peripheral portion and the refractive power at the central portion of each of the fourth lens 4R and the fifth lens 4B in the cemented lens 4sm may be properly set. In at least one of the fourth lens 4R and the fifth lens 4B, the refractive power at the peripheral portion and the refractive power at the central portion are made different so as to independently correct aberrations in light beams with different image heights, and a variety of aberrations, such as lateral chromatic aberration, can be effectively corrected. At least one of the following inequalities may be satisfied:

$$0.05<|f7r/fr-1|<20.00 \tag{3a}$$

$$0.05<|f7b/fb-1|<20.00 \tag{3b}$$

where f7r is a focal length in an area of 70% of an effective diameter of the fourth lens 4R, fr is a paraxial focal distance in a central area of the effective diameter of the fourth lens 4R, f7b is a focal length in an area of 70% of an effective diameter of the fifth lens 4B, and fb is a paraxial focal distance in a central area of the effective diameter of the fifth lens 4B.

The focal length f7r in the area of 70% of the effective diameter of the fourth lens 4R is as follows: It is a value calculated by replacing an object-side curvature radius r1 (a radius of curvature r1 on the object side) that is used to calculate the focal length of the fourth lens 4R with a radius of curvature r7r1 calculated from an area of 70% of the effective diameter of the surface on the object side. In addition, it is a value calculated by replacing an image-side curvature radius r2 (a radius of curvature r2 on the image side) that is used to calculate the focal length of the fourth lens 4R with a radius of curvature r7r2 calculated from an area of 70% of the effective diameter of the surface on the image side. The focal length f7b in the area of 70% of the effective diameter of the fifth lens 4B is as follows: It is a value calculated by replacing the object-side curvature radius b1 (a radius of curvature b1 on the object side) that is used to calculate the focal length of the fifth lens 4B with a radius of curvature r7b1 calculated from an area of 70% of the effective diameter of the surface on the object side. In addition, it is a value calculated by replacing an image-side curvature radius b2 (a radius of curvature b2 on the image side) that is used to calculate the focal length of the fifth lens 4B with a radius of curvature 7b2 calculated from an area of 70% of the effective diameter of the surface on the image side.

In the optical system according to each example, an aspherical shape is expressed by the following equation (A):

$$x(h) = \frac{\left(\frac{h^2}{r}\right)}{1+\sqrt{\left\{1-(1+k)\left(\frac{h}{r}\right)^2\right\}}} + A_4 h^4 + A_6 h^6 + A_8 h^8 + A_{10} h^{10} + \ldots \quad (A)$$

where x is a displacement amount from a surface vertex in the optical axis direction, h is a height from the optical axis in a direction orthogonal to the optical axis, r is a paraxial radius of curvature, and k is a conic constant, and Ai (i=4, 6, 8, . . . ) is an aspheric coefficient of each order.

The radius of curvature r7 in an area of 70% of the effective diameter can be calculated from the following equation (B):

$$r7 = \frac{(xh^2 + h^2)}{2 \times xh} \quad (B)$$

where xh is a displacement amount in the optical axis direction at a height h from the optical axis in an area of 70% of the effective diameter calculated from equation (A).

An effective beam diameter is twice as long as a distance from a position farthest from the optical axis to the optical axis in an area through which the effective imaging light beam can pass on each optical surface. An effective imaging light beam means a light beam from which stray light and rays that form an image on the image plane IP outside an image recording area on the image plane IP. For the surface closest to the object of the optical system according to this example, the effective beam diameter is equal to twice as long as a larger one of distances from the optical axis to each of positions at which a bottom line or a top line of the most off-axis light beam passes through the optical surface. In each example, an effective beam diameter may be referred to as an effective diameter, a maximum effective diameter, or the like. The optical surface refers to a lens surface, both surfaces of a flat plate, a cemented surface of them, and the like. A value obtained by dividing the effective beam diameter by 2 is called an effective radius.

In a case where the value is lower than the lower limit of inequality (3a) or (3b), a change in refractive power between the central portion and the peripheral portion of the lens becomes small, and correction of a variety of aberrations in the off-axis light beam becomes insufficient. In a case where the value is higher than the upper limit of inequality (3a) or (3b), the change in refractive power between the central portion and the peripheral portion of the lens becomes large, the curvature of the peripheral portion sharply changes, and curvature of field, etc. cannot be reduced.

Inequalities (3a) and (3b) may be replaced with inequalities (3c) and (3d) below, respectively:

$$0.06 < |f7r/fr - 1| < 12.00 \quad (3c)$$

$$0.06 < |f7b/fb - 1| < 12.00 \quad (3d)$$

Inequalities (3a) and (3b) may be replaced with inequalities (3e) and (3f) below, respectively:

$$0.08 < |f7r/fr - 1| < 6.00 \quad (3e)$$

$$0.08 < |f7b/fb - 1| < 6.00 \quad (3f)$$

In the optical system according to each example, properly setting the Abbe number of the material of the cemented lens 4sm and the focal length in the area of 70% of the effective diameter can satisfactorily correct a variety of aberrations, such as lateral chromatic aberration. The following inequality (4) may be satisfied:

$$0.000 < |f/(f7r \times vr) + f/(f7b \times vb)| < 0.050 \quad (4)$$

where f7r is the focal length in the area of 70% of the effective diameter of the fourth lens 4R, vr is the Abbe number of the fourth lens 4R, f7b is the focal length in the area of 70% of the effective diameter of the fifth lens 4B, vb is the Abbe number of the fifth lens 4B, and f is the focal length of the optical system (entire system).

In a case where the value is higher than the upper limit or lower than the lower limit of inequality (4), the chromatic aberration in the cemented lens 4sm increases, and the chromatic aberration of the entire optical system cannot be reduced. A variety of aberrations cannot be reduced because the correction balance between the chromatic aberration and other aberrations is lost.

Inequality (4) may be replaced with inequality (4a) below:

$$0.000 < |f/(f7r \times vr) + f/(f7b \times vb)| < 0.028 \quad (4a)$$

Inequality (4) may be replaced with inequality (4b) below:

$$0.000 < |f/(f7r \times vr) + f/(f7b \times vb)| < 0.023 \quad (4b)$$

Properly setting the refractive power of the peripheral portion of the cemented lens 4sm and the refractive powers of the peripheral portions of the fourth lens 4R and the fifth lens 4B in the cemented lens 4sm can satisfactorily correct a variety of aberrations including chromatic aberration. At least one of the following inequalities (5a) and (5b) may be satisfied:

$$0.1 < |f7sm/f7r| < 6.0 \quad (5a)$$

$$0.1 < |f7sm/f7b| < 6.0 \quad (5b)$$

where f7sm is a focal length in an area of 70% of an effective diameter of the cemented lens 4sm, f7r is the focal length in the area of 70% of the effective diameter of the fourth lens 4R, and f7b is the focal length in the area of 70% of the effective diameter of the fifth lens 4B.

The focal length f7sm in the area of 70% of the effective diameter of the cemented lens 4sm may be as follows: It is a value calculated by replacing the radii of curvature r1, r2, b1, and b2 of lens surfaces that are used to calculate the focal lengths of the cemented lens 4sm with the radii of curvature r7r1, r7r2, r7b1, and r7b2 calculated from the area of 70% of the effective diameter of each lens surface. In a case where the value is higher than the upper limit or lower than the lower limit of inequality (5a) or (5b), an excessively strong refractive power is generated in the lens peripheral portion, and it becomes difficult to correct a variety of aberrations.

Inequalities (5a) and (5b) may be replaced with inequalities (5c) and (5d) below, respectively:

$$0.2<|f1sm/f1r|<5.0 \qquad (5c)$$

$$0.2<|f1sm/f1b|<5.0 \qquad (5d)$$

Inequalities (5a) and (5b) may be replaced with inequalities (5e) and (5f) below, respectively:

$$0.5<|f1sm/f1r|<4.0 \qquad (5e)$$

$$0.5<|f1sm/f1b|<4.0 \qquad (5f)$$

The optical system according to each example may satisfy the following inequality (6):

$$0.7<f2/f<5.0 \qquad (6)$$

where f is the focal length of the optical system (entire system), and f2 is a focal length of the second unit L2. Satisfying inequality (6) can correct spherical aberration to a proper value.

Inequality (6) may be replaced with inequality (6a) below:

$$0.9<f2/f<4.0 \qquad (6a)$$

Inequality (6) may be replaced with inequality (6b) below:

$$0.9<f2/f<2.0 \qquad (6b)$$

The optical system according to each example may satisfy the following inequality (7):

$$-4.0<f3/f1<-0.3 \qquad (7)$$

where f1 is a focal length of the first unit L1, and f3 is a focal length of the third unit L3. Astigmatism and distortion can be corrected to proper values by satisfying inequality (7).

Inequality (7) may be replaced with inequality (7a) below:

$$-3.5<f3/f1<-0.5 \qquad (7a)$$

Inequality (7) may be replaced with inequality (7b) below:

$$-3.0<f3/f1<-0.7 \qquad (7b)$$

The optical system according to each example is configured to cancel a variety of aberrations between the first unit L1 having negative refractive power and the second unit L2 having positive refractive power, and to keep balance with the generated aberration using the third unit disposed closest to the image plane. The following inequality (8) may be satisfied:

$$0.3<(f2-f1)/f3<7.0 \qquad (8)$$

In a case where the value is lower than the lower limit of inequality (8), the refractive power of the third unit L3 becomes low, and the balance of aberration correction is lost. In a case where the value is higher than the upper limit of inequality (8), the refractive power of the third unit L3 becomes high, it becomes difficult to correct a variety of aberrations, the diameter of the third unit L3 becomes large, it becomes difficult to secure the effective width, and manufacture difficulty increases.

Inequality (8) may be replaced with inequality (8a) below:

$$0.5<(f2-f1)/f3<5.0 \qquad (8a)$$

Inequality (8) may be replaced with inequality (8b) below:

$$0.6<(f2-f1)/f3<2.0 \qquad (8b)$$

In the optical system according to each example, properly setting the refractive power of the third unit L3 disposed closest to the image plane can effectively correct the incident angle, distortion, and curvature of field of the light beam incident on the image plane. Therefore, a variety of aberrations can be corrected more satisfactorily by satisfying the following inequality (9):

$$0.5<f3/f<4.0 \qquad (9)$$

Inequality (9) may be replaced with inequality (9a) below:

$$0.9<f3/f<3.0 \qquad (9a)$$

Inequality (9) may be replaced with inequality (9b) below:

$$1.1<f3/f<2.5 \qquad (9b)$$

The optical system according to each example may satisfy the following inequality (10):

$$0.5<L/f<3.5 \qquad (10)$$

where L is a distance on the optical axis from a third lens 32 to the image plane IP. Spherical aberration and astigmatism can be corrected to proper values by satisfying inequality (10).

Inequality (10) may be replaced with inequality (10a) below:

$$0.8<L/f<2.6 \qquad (10a)$$

The optical system according to each example is a wide-angle optical system, and plays a large role in the aberration correcting effect in the first unit L1 that is only one lens unit having negative refractive power. In particular, since off-axis rays are significantly bent by a lens surface facing air in the first unit L1, it is important to properly set a refractive power of the surface facing air of the first unit L1 and a distance to the aperture stop. The following inequality (11) may be satisfied:

$$-2.0<da1 \times f1/(f \times Yim)<-0.3 \qquad (11)$$

where da1 is a distance on the optical axis from the lens surface closest to the image plane of the lens in the first unit L1 to the aperture stop SP, and Yim is a maximum image height.

In a case where the value is lower than the lower limit of inequality (11), the refractive power of the first unit L1 becomes weak, it becomes difficult to correct aberrations in the rear unit, and the miniaturization of the optical system becomes difficult because the effective diameter of the first unit L1 becomes large. In a case where the value is higher than the upper limit of inequality (11), the refractive power of the first unit L1 becomes strong, high-order aberrations occur, and a variety of aberrations such as curvature of field cannot be reduced.

Inequality (11) may be replaced with inequality (11a) below:

$$-1.5<da1 \times f1/(f \times Yim)<-0.6 \qquad (11a)$$

Inequality (11) may be replaced with inequality (11b) below:

$$-1.4<da1 \times f1/(f \times Yim)<-0.7 \qquad (11b)$$

In a case where a plurality of aperture stops are disposed in the optical system in each example, an aperture stop that is closer to a point where an off-axis ray at the image height of 70% of the maximum image height intersects the optical axis fulfills a function as the aperture stop SP.

The optical system according to each example will be described in detail below.

Example 1

Referring now to FIGS. 1 and 2A to 2D, a description will be given of the optical system 1a according to Example 1 (numerical example 1).

As illustrated in FIG. 1, the optical system 1a includes a plurality of units. The plurality of units consist of the first unit L1, the second unit L2, and the third unit L3. The first unit L1 includes the first substrate (front cover glass) 11, and the first lens 12 disposed on the image side of the first substrate 11. The first lens 12 is a negative lens with a concave surface facing the image side, and is formed on the surface on the image side of the first substrate 11 using the wafer level process. The second unit L2 includes the second substrate 21, the second lens 22 disposed on the object side of the second substrate 21, and the aperture stop SP disposed on the image side of the second substrate 21. The second lens 22 is a positive lens with a convex surface facing the object side, and is formed on the surface on the object side of the second substrate 21 using the wafer level process. The third unit L3 includes the third substrate 31, the cemented lens 4sm disposed on the object side of the third substrate 31, and the fourth substrate 41 which is a sensor cover glass.

The cemented lens 4sm includes, in order from the object side to the image side, the third lens 32 (fifth lens 4B) having positive refractive power near the optical axis, and the fourth lens 4R having positive refractive power near the optical axis. The third lens 32 and the fourth lens 4R have Abbe numbers different from each other and refractive powers different from each other.

The third lens 32 has positive refractive power in an area of 70% of the effective diameter. The fourth lens 4R has negative refractive power in an area of 70% of the effective diameter. The fourth lens 4R is formed on the surface on the object side of the third substrate 31 using the wafer level process. The third lens 32 is closely cemented with the surface on the object side of the fourth lens 4R using the wafer level process.

The optical system 1a according to this example is designed to focus on an object located 5 mm from the surface closest to the object of the first unit L1. The optical system 1a is a very small, bright, and wide-angle optical system that has a half angle of view of 59.6° and an F-number of 2.8.

Figures 2A, 2B, 2C, 2D:
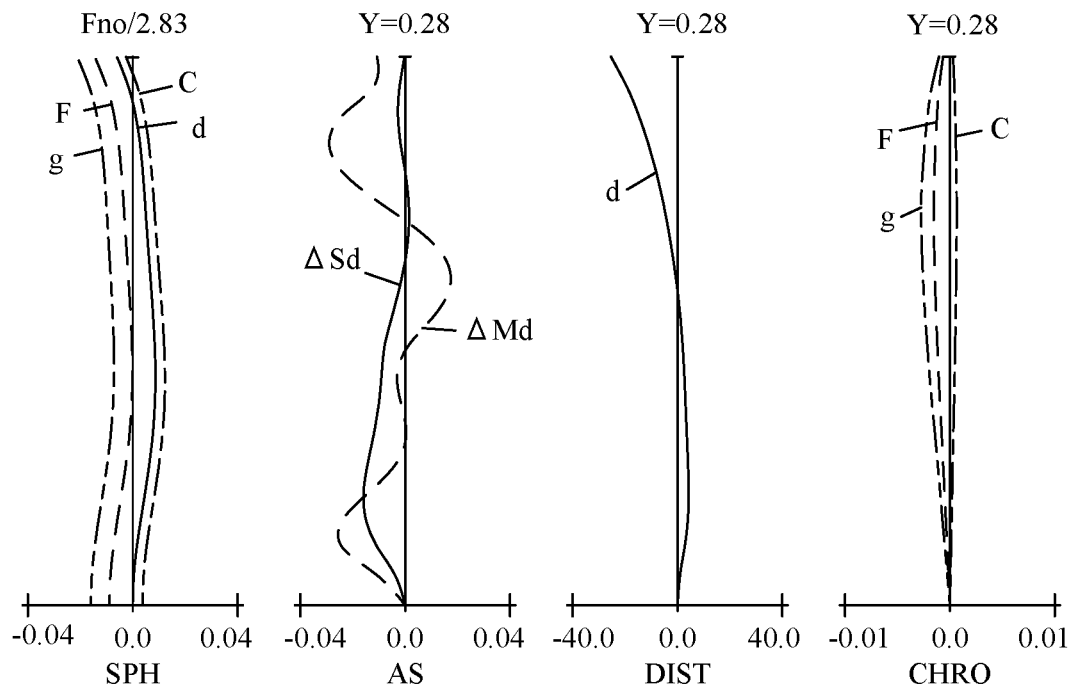
FIGS. 2A to 2D are aberration diagrams of the optical system according to Example 1.

FIGS. 2A to 2D illustrate aberration diagrams of the optical system 1a according to this example. As illustrated in FIG. 2A, a spherical aberration amount in this example is smaller than 0.04 mm. As illustrated in FIG. 2B, an astigmatism amount in this example is smaller than 0.04 mm. As illustrated in FIG. 2C, a distortion amount in this example is smaller than 40%. As illustrated in FIG. 2D, a lateral chromatic aberration amount in this example is smaller than 0.01 mm.

As described above, the optical system 1a according to this example includes the cemented lens 4sm, and is a small, bright, and wide-angle optical system in which a variety of aberrations are satisfactorily corrected from an on-axis light beam to an off-axis light beam.

Example 2

Referring now to FIGS. 3 and 4A to 4D, a description will be given of the optical system 1b according to Example 2 (numerical example 2).

Figure 3:
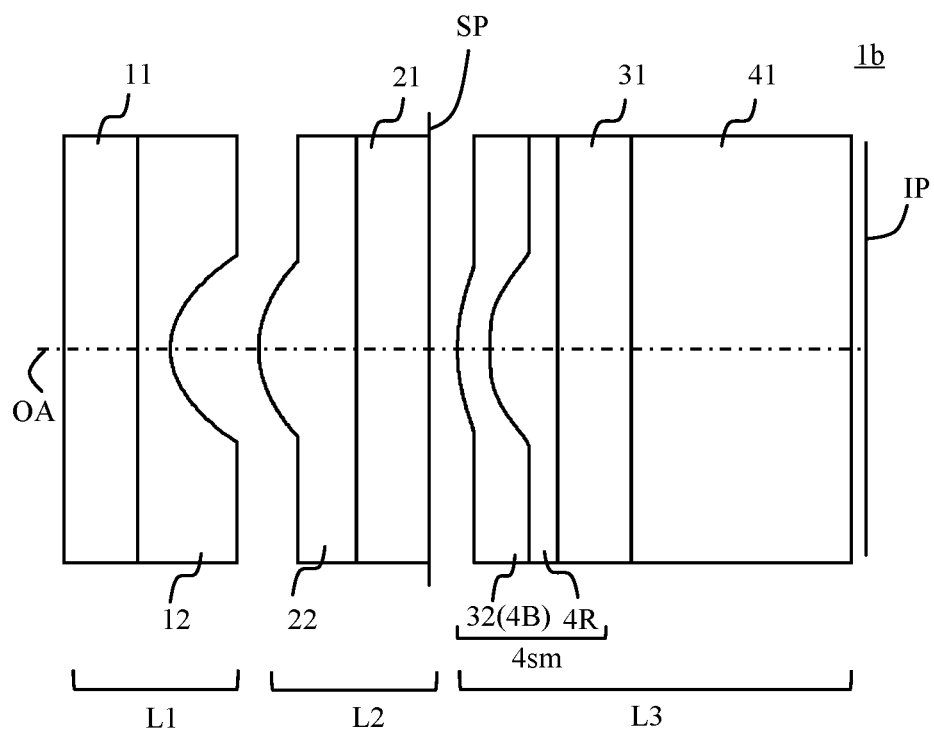
FIG. 3 is a sectional view of an optical system according to Example 2.

As illustrated in FIG. 3, the optical system 1b includes a plurality of units. The plurality of units consist of the first unit L1, the second unit L2, and the third unit L3. The first unit L1 includes the first substrate (front cover glass) 11 and the first lens 12 disposed on the image side of the first substrate 11. The first lens 12 is a negative lens with a concave surface facing the image side, and is formed on the surface on the image side of the first substrate 11 using the wafer level process. The second unit L2 includes the second substrate 21, the second lens 22 disposed on the object side of the second substrate 21, and the aperture stop SP disposed on the image side of the second substrate 21. The second lens 22 is a positive lens with a convex surface facing the object side, and is formed on the surface on the object side of the second substrate 21 using the wafer level process. The third unit L3 includes the third substrate 31, the cemented lens 4sm disposed on the object side of the third substrate 31, and the fourth substrate 41 which is a sensor cover glass.

The cemented lens 4sm includes, in order from the object side to the image side, the third lens 32 (fifth lens 4B) having positive refractive power near the optical axis and the fourth lens 4R having negative refractive power near the optical axis. The third lens 32 and the fourth lens 4R have Abbe numbers different from each other and refractive powers different from each other.

The third lens 32 has negative refractive power in an area of 70% of the effective diameter. The fourth lens 4R has positive refractive power in an area of 70% of the effective diameter. The fourth lens 4R is formed on the surface on the object side of the third substrate 31 using the wafer level process. The third lens 32 is closely cemented with the surface on the object side of the fourth lens 4R using the wafer level process.

The optical system 1b according to this example is designed to focus on an object located 5 mm from the surface closest to the object of the first unit L1. The optical system 1b is a very small, bright, and wide-angle optical system that has a half angle of view of 59.0° and an F-number of 2.8.

Figures 4A, 4B, 4C, 4D:
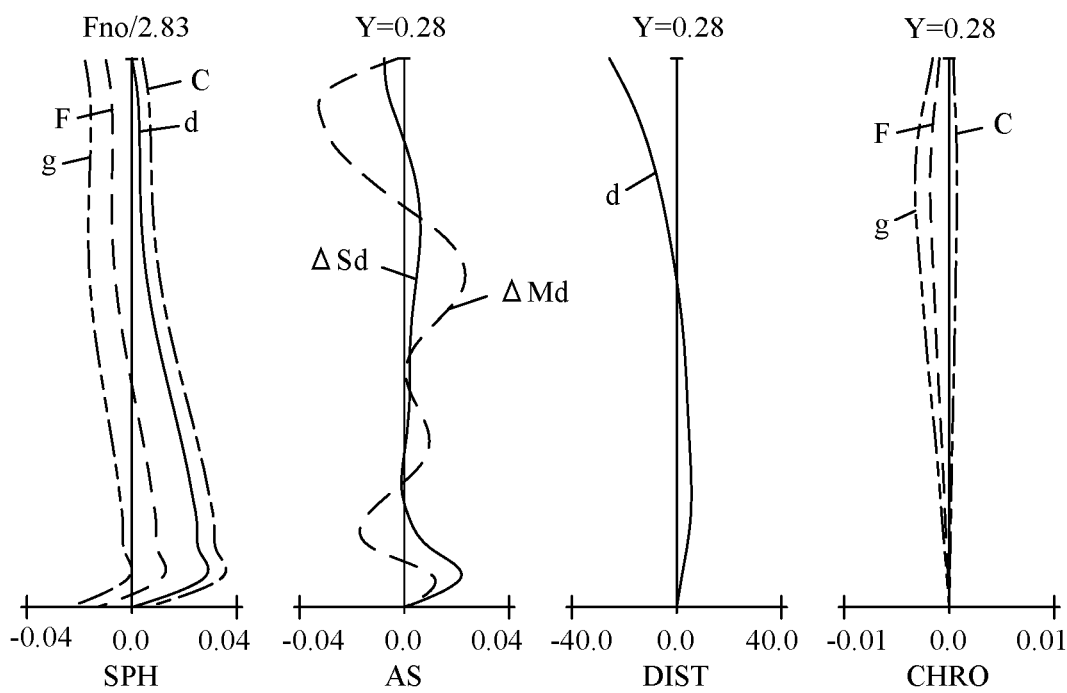
FIGS. 4A to 4D are aberration diagrams of the optical system according to Example 2.

FIGS. 4A to 4D illustrate aberration diagrams of the optical system 1b according to this example. As illustrated in FIG. 4A, a spherical aberration amount in this example is smaller than 0.04 mm. As illustrated in FIG. 4B, an astigmatism amount in this example is smaller than 0.04 mm. As illustrated in FIG. 4C, a distortion amount in this example is smaller than 40%. As illustrated in FIG. 4D, a lateral chromatic aberration amount in this example is smaller than 0.01 mm.

As described above, the optical system 1b according to this example includes the cemented lens 4sm, and is a small, bright, and wide-angle optical system in which a variety of aberrations are satisfactorily corrected from an on-axis light beam to an off-axis light beam.

Example 3

Referring now to FIGS. 5 and 6A to 6D, a description will be given of the optical system 1c according to Example 3 (numerical example 3).

Figure 5:
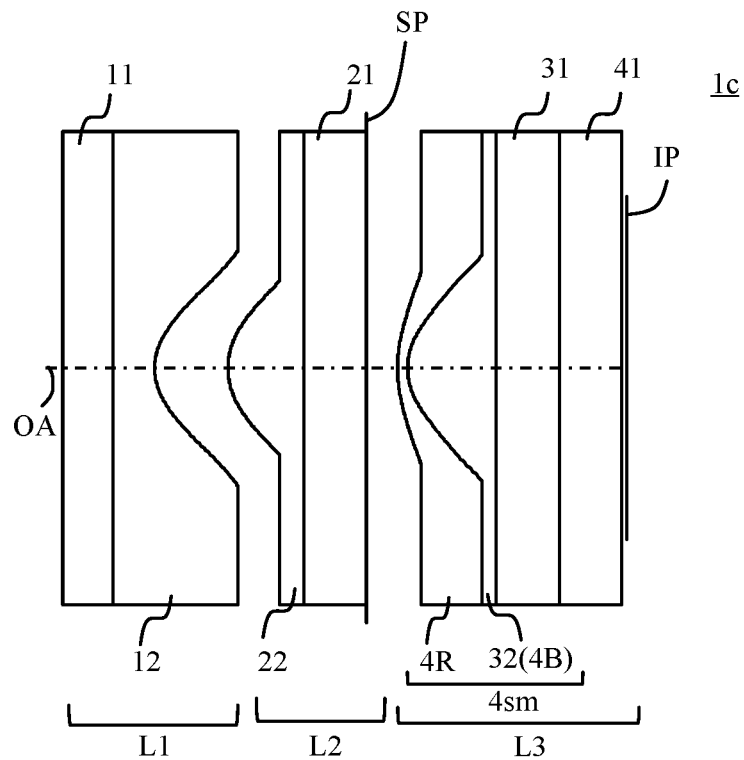
FIG. 5 is a sectional view of an optical system according to Example 3.

As illustrated in FIG. 5, the optical system 1c includes a plurality of units. The plurality of units consist of the first unit L1, the second unit L2, and the third unit L3. The first unit L1 includes the first substrate (front cover glass) 11, and the first lens 12 disposed on the image side of the first substrate 11. The first lens 12 is a negative lens with a concave surface facing the image side, and is formed on the surface on the image side of the first substrate 11 using the wafer level process. The second unit L2 includes the second substrate 21, the second lens 22 disposed on the object side of the second substrate 21, and the aperture stop SP disposed on the image side of the second substrate 21. The second lens 22 is a positive lens with a convex surface facing the object side, and is formed on the surface on the object side of the second substrate 21 using the wafer level process. The third unit L3 includes the third substrate 31, the cemented lens 4sm disposed on the object side of the third substrate 31, and the fourth substrate 41 which is a sensor cover glass.

The cemented lens 4sm includes, in order from the object side to the image side, the fourth lens 4R having negative refractive power near the optical axis and the third lens 32 (fifth lens 4B) having positive refractive power near the optical axis. The third lens 32 and the fourth lens 4R have Abbe numbers different from each other and refractive powers different from each other.

The third lens 32 has positive refractive power in an area of 70% of the effective diameter. The fourth lens 4R has negative refractive power in an area of 70% of the effective diameter. The third lens 32 is formed on the surface on the object side of the third substrate 31 using the wafer level process. The fourth lens 4R is closely cemented with the surface on the object side of the third lens 32 using the wafer level process.

The optical system 1c according to this example is designed to focus on an object positioned 50 mm from the surface closest to the object of the first unit L1. The optical system 1c is a very small, bright, and wide-angle optical system that has a half angle of view of 59.0° and an F-number of 2.9.

Figures 6A, 6B, 6C, 6D:
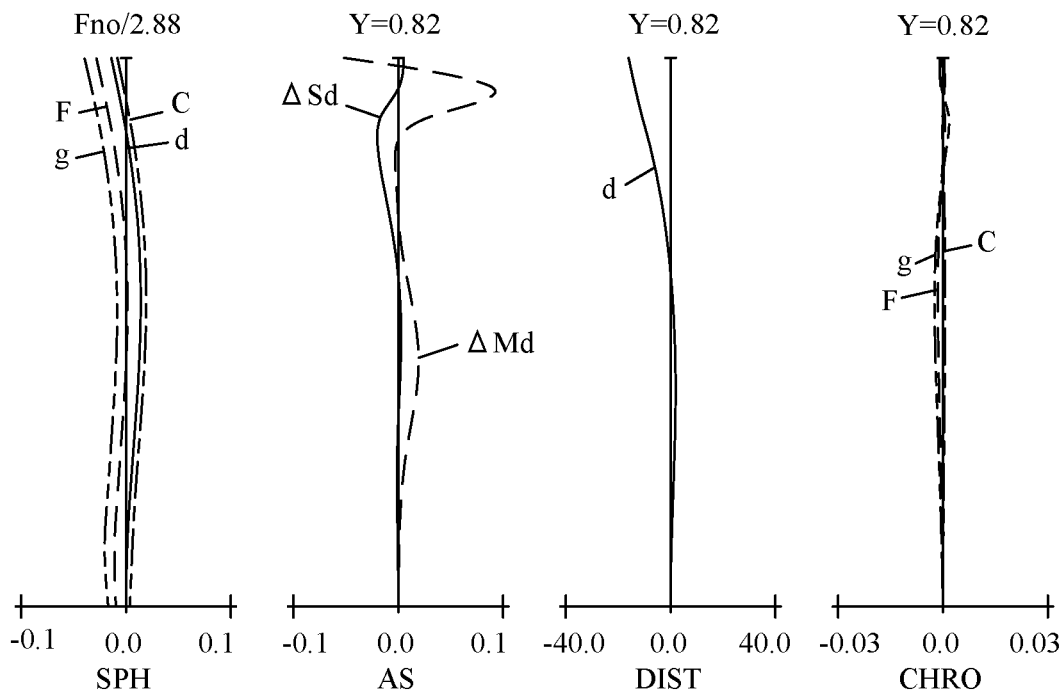
FIGS. 6A to 6D are aberration diagrams of the optical system according to Example 3.

FIGS. 6A to 6D illustrate aberration diagrams of the optical system 1c according to this example. As illustrated in FIG. 6A, a spherical aberration amount in this example is smaller than 0.1 mm. As illustrated in FIG. 6B, an astigmatism amount in this example is smaller than 0.1 mm. As illustrated in FIG. 6C, a distortion amount in this example is smaller than 40%. As illustrated in FIG. 6D, a lateral chromatic aberration amount in this example is smaller than 0.03 mm.

As described above, the optical system 1c according to this example includes the cemented lens 4sm, and is a small, bright, and wide-angle optical system in which a variety of aberrations are satisfactorily corrected from an on-axis light beam to an off-axis light beam.

Example 4

Referring now to FIGS. 7 and 8A to 8D, a description will be given of the optical system 1d according to Example 4 (numerical example 4).

Figure 7:
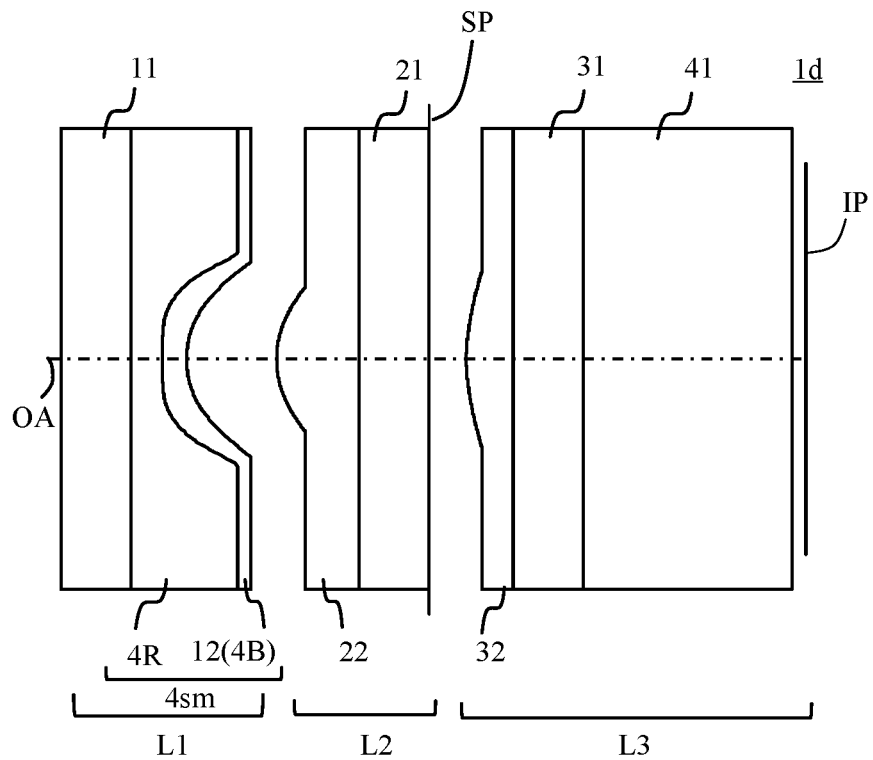
FIG. 7 is a sectional view of an optical system according to Example 4.

As illustrated in FIG. 7, the optical system 1d includes a plurality of units. The plurality of units consists of the first unit L1, the second unit L2, and the third unit L3. The first unit L1 includes the first substrate (front cover glass) 11 and the cemented lens 4sm disposed on the image side of the first substrate 11. The cemented lens 4sm includes, in order from the object side to the image side, the fourth lens 4R having negative refractive power near the optical axis and the first lens 12 (fifth lens 4B) having negative refractive power near the optical axis. The first lens 12 and the fourth lens 4R have Abbe numbers different from each other and refractive powers different from each other.

The first lens 12 has negative refractive power in an area of 70% of the effective diameter. The fourth lens 4R has negative refractive power in an area of 70% of the effective diameter. The fourth lens 4R is formed on the surface on the image side of the first substrate 11 using the wafer level process. The first lens 12 is closely cemented with the surface on the image side of the fourth lens 4R using the wafer level process.

The second unit L2 includes the second substrate 21, the second lens 22 disposed on the object side of the second substrate 21, and the aperture stop SP disposed on the image side of the second substrate 21. The second lens 22 is a positive lens with a convex surface facing the object side, and is formed on the surface on the object side of the second substrate 21 using the wafer level process. The third unit L3 includes the third substrate 31, the third lens 32 disposed on the object side of the third substrate 31, and the fourth substrate 41 which is a sensor cover glass. The third lens 32 is a positive lens having a convex surface facing the object side, and is formed on the surface on the object side of the third substrate 31 using the wafer level process.

The optical system 1d according to this example is designed to focus on an object located 5 mm from the surface closest to the object of the first unit L1. The optical system 1d is a very small, bright, and wide-angle optical system that has a half angle of view of 59.0° and an F-number of 2.8.

Figures 8A, 8B, 8C, 8D:
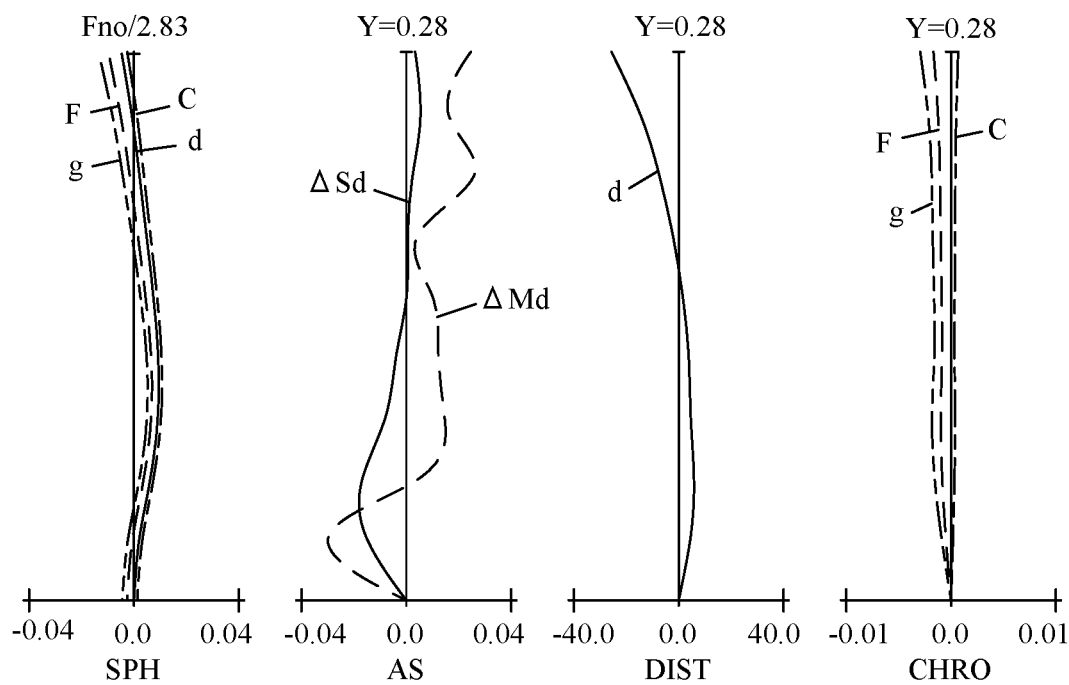
FIGS. 8A to 8D are aberration diagrams of the optical system according to Example 4.

FIGS. 8A to 8D illustrate aberration diagrams of the optical system 1d according to this example. As illustrated in FIG. 8A, a spherical aberration amount in this example is smaller than 0.04 mm. As illustrated in FIG. 8B, an astigmatism amount in this example is smaller than 0.04 mm. As illustrated in FIG. 8C, a distortion amount in this example is smaller than 40%. As illustrated in FIG. 8D, a lateral chromatic aberration amount in this example is smaller than 0.01 mm.

As described above, the optical system 1d according to this example includes the cemented lens 4sm, and is a small, bright, and wide-angle optical system in which a variety of aberrations are satisfactorily corrected from an on-axis light beam to an off-axis light beam.

Example 5

Referring now to FIGS. 9 and 10A to 10D, a description will be given of the optical system 1e according to Example 5 (numerical example 5).

Figure 9:
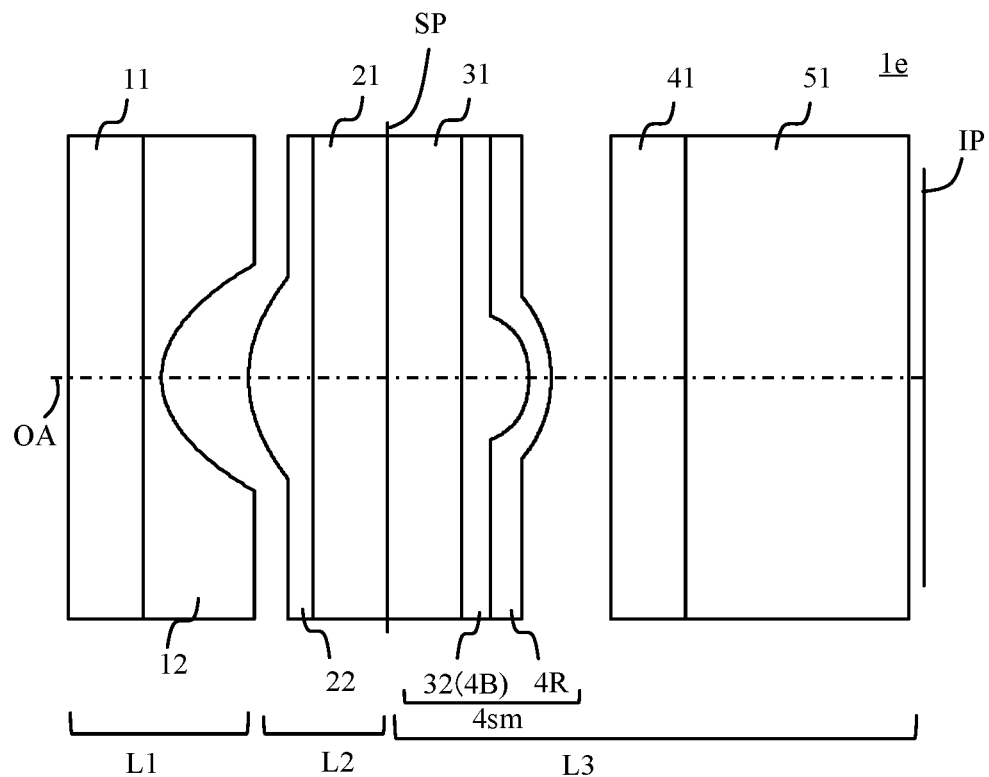
FIG. 9 is a sectional view of an optical system according to Example 5.

As illustrated in FIG. 9, the optical system 1e includes a plurality of units. The plurality of units consist of the first unit L1, the second unit L2, and the third unit L3. The first unit L1 includes the first substrate (front cover glass) 11 and the first lens 12 disposed on the image side of the first substrate 11. The first lens 12 is a negative lens with a concave surface facing the image side, and is formed on the surface on the image side of the first substrate 11 using the wafer level process. The second unit L2 includes the second substrate 21, the second lens 22 disposed on the object side of the second substrate 21, and the aperture stop SP disposed on the image side of the second substrate 21. The second lens 22 is a positive lens with a convex surface facing the object side, and is formed on the surface on the object side of the second substrate 21 using the wafer level process. The third unit L3 includes the third substrate 31, the cemented lens 4sm disposed on the image side of the third substrate 31, the fourth substrate 41 as a back cover glass, and the fifth substrate 51 as a sensor cover glass. The second unit L2 and the third unit L3 are cemented via the surface on the image side of the second substrate 21 and the surface on the object side of the third substrate 31.

The cemented lens 4sm includes, in order from the object side to the image side, the third lens 32 (fifth lens 4B) having positive refractive power near the optical axis and the fourth lens 4R having negative refractive power near the optical axis. The third lens 32 and the fourth lens 4R have Abbe numbers different from each other and refractive powers different from each other.

The third lens 32 has positive refractive power in an area of 70% of the effective diameter. The fourth lens 4R has negative refractive power in an area of 70% of the effective diameter. The third lens 32 is formed on the surface on the image side of the third substrate 31 using the wafer level process. The fourth lens 4R is closely cemented with the surface on the image side of the third lens 32 using the wafer level process.

The optical system 1e according to this example is designed to focus on an object located 5 mm from the surface closest to the object of the first unit L1. The optical system 1e is a very small, bright, and wide-angle optical system that has a half angle of view of 58.6° and an F-number of 2.8.

Figures 10A, 10B, 10C, 10D:
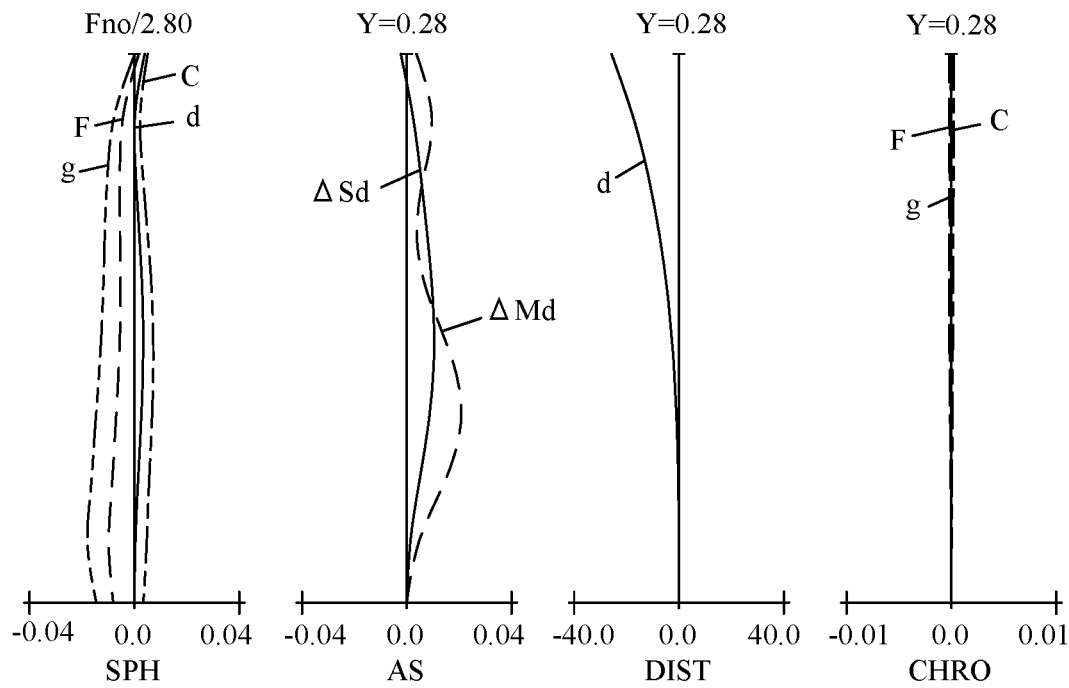
FIGS. 10A to 10D are aberration diagrams of the optical system according to Example 5.

FIGS. 10A to 10D illustrate aberration diagrams of the optical system 1e in this example. As illustrated in FIG. 10A, a spherical aberration amount in this example is smaller than 0.04 mm. As illustrated in FIG. 10B, an astigmatism amount in this example is smaller than 0.04 mm. As illustrated in FIG. 10C, a distortion amount in this example is smaller than 40%. As illustrated in FIG. 10D, a lateral chromatic aberration amount in this example is smaller than 0.01 mm.

As described above, the optical system 1e according to this example has the cemented lens 4sm, and is a small, bright, and wide-angle optical system in which a variety of aberrations are satisfactorily corrected from an on-axis light beam to an off-axis light beam.

Example 6

Referring now to FIGS. 11 and 12A to 12D, a description will be given of the optical system if according to Example 6 (numerical example 6).

Figure 11:
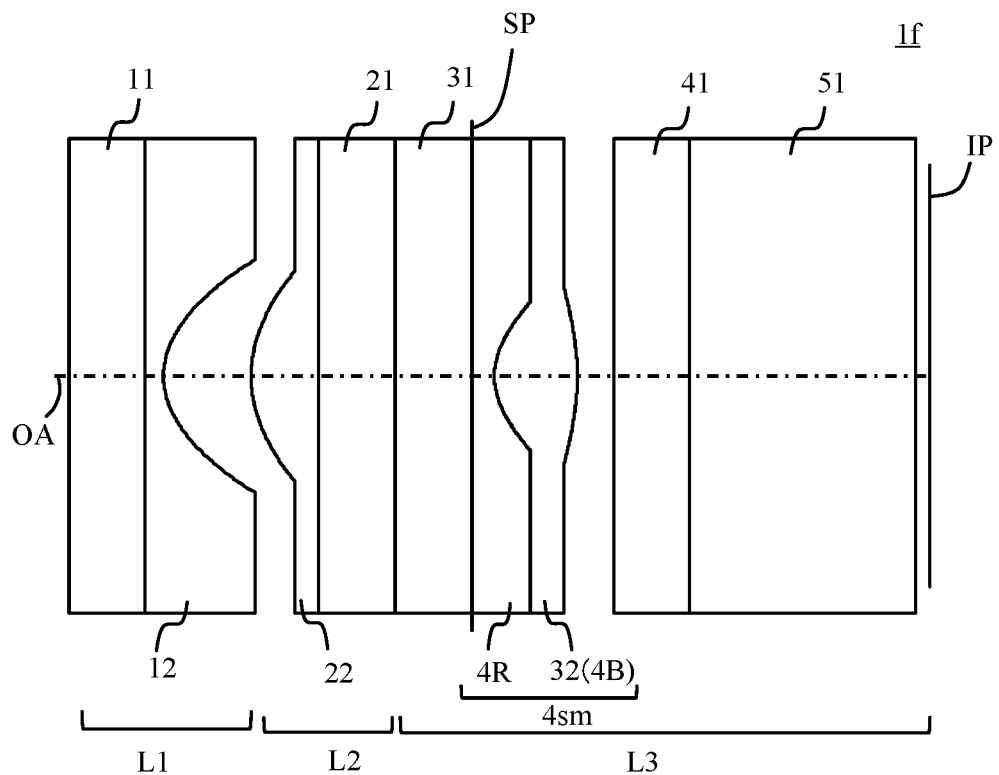
FIG. 11 is a sectional view of an optical system according to Example 6.

As illustrated in FIG. 11, the optical system if includes a plurality of units. The plurality of units consist of the first unit L1, the second unit L2, and the third unit L3. The first unit L1 includes the first substrate (front cover glass) 11, and the first lens 12 disposed on the image side of the first substrate 11. The first lens 12 is a negative lens with a concave surface facing the image side, and is formed on the surface on the image side of the first substrate 11 using the wafer level process. The second unit L2 includes the second substrate 21, and the second lens 22 disposed on the object side of the second substrate 21. The second lens 22 is a positive lens with a convex surface facing the object side, and is formed on the surface on the object side of the second substrate 21 using the wafer level process. The third unit L3 includes the third substrate 31, the cemented lens 4sm disposed on the image side of the third substrate 31, the aperture stop SP disposed on the image side of the third substrate 31, the fourth substrate 41 which is a back cover glass, and the fifth substrate 51 as a sensor cover glass. The second unit L2 and the third unit L3 are cemented via the surface on the image side of the second substrate 21 and the surface on the object side of the third substrate 31.

The cemented lens 4sm includes, in order from the object side to the image side, the fourth lens 4R having negative refractive power near the optical axis and the third lens 32 (fifth lens 4B) having positive refractive power near the optical axis. The third lens 32 and the fourth lens 4R have Abbe numbers different from each other and refractive powers different from each other.

The third lens 32 has positive refractive power in an area of 70% of the effective diameter. The fourth lens 4R has negative refractive power in an area of 70% of the effective diameter. The fourth lens 4R is formed on the surface on the image side of the third substrate 31 using the wafer level process. The third lens 32 is closely cemented with the surface on the image side of the fourth lens 4R using the wafer level process.

The optical system if according to this example is designed to focus on an object located 5 mm from the surface closest to the object of the first unit L1. The optical system if is a very small, bright, and wide-angle optical system that has a half angle of view of 59.0° and an F-number of 2.8.

Figures 12A, 12B, 12C, 12D:
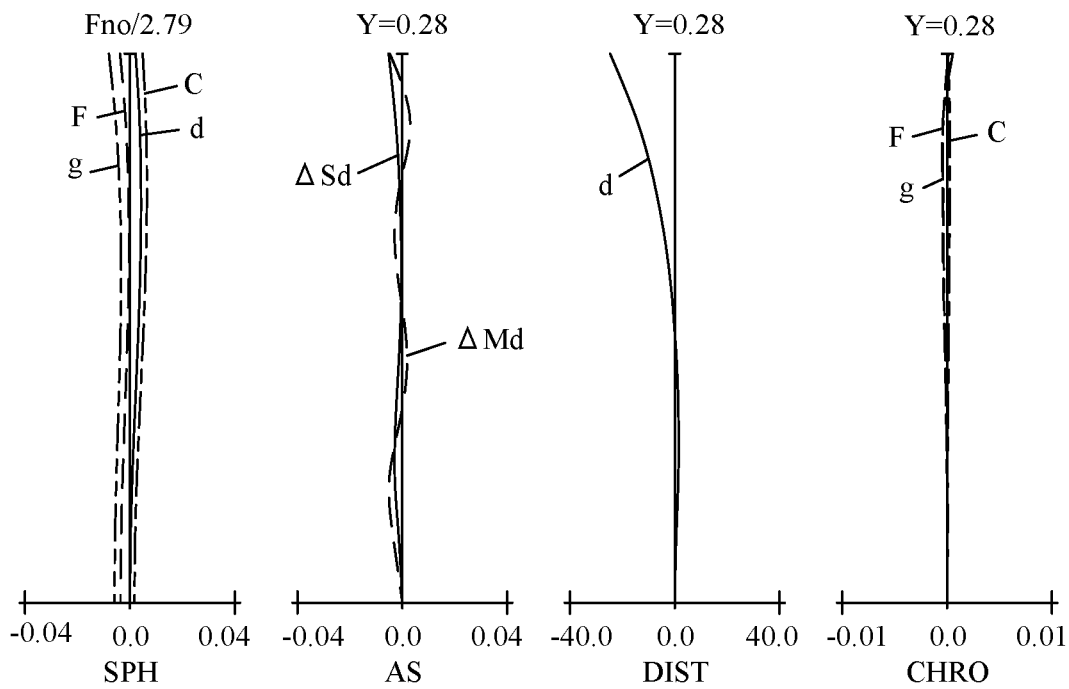
FIGS. 12A to 12D are aberration diagrams of the optical system according to Example 6.

FIGS. 12A to 12D illustrate aberration diagrams of the optical system if according to this example. As illustrated in FIG. 12A, a spherical aberration amount in this example is smaller than 0.04 mm. As illustrated in FIG. 12B, an astigmatism amount in this example is smaller than 0.04 mm. As illustrated in FIG. 12C, a distortion amount in this example is smaller than 40%. As illustrated in FIG. 12D, a lateral chromatic aberration amount in this example is smaller than 0.01 mm.

As described above, the optical system if according to this example includes the cemented lens 4sm, and is a small, bright, and wide-angle optical system in which a variety of aberrations are satisfactorily corrected from an on-axis light beam to an off-axis light beam.

Example 7

Referring now to FIGS. 13 and 14A to 14D, a description will be given of the optical system 1g according to Example 7 (numerical example 7).

Figure 13:
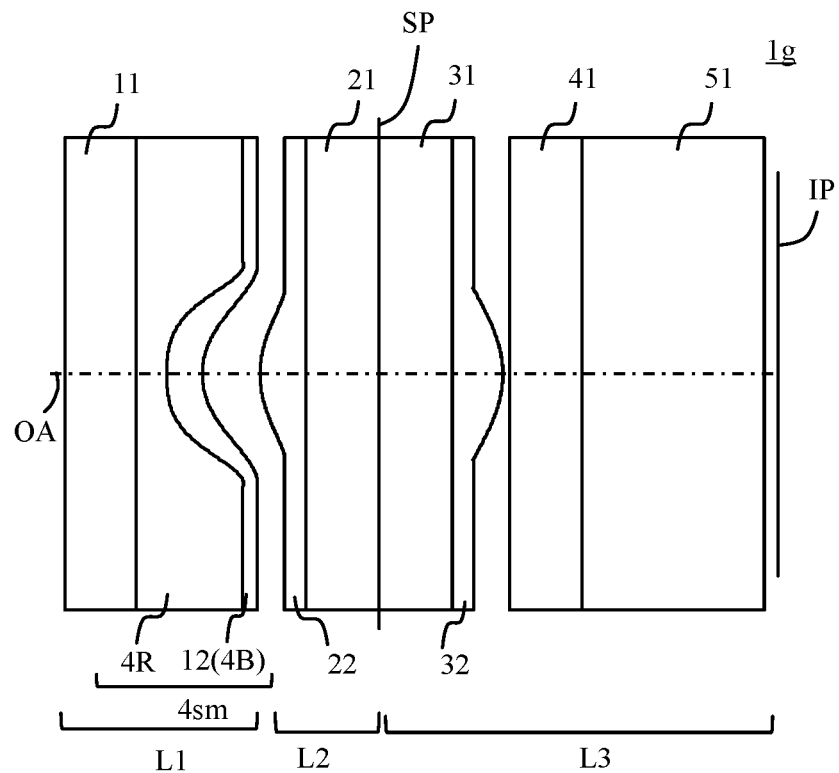
FIG. 13 is a sectional view of an optical system according to Example 7.

As illustrated in FIG. 13, the optical system 1g includes a plurality of units. The plurality of units consist of the first unit L1, the second unit L2, and the third unit L3. The first unit L1 includes the first substrate (front cover glass) 11 and the cemented lens 4sm disposed on the image side of the first substrate 11. The cemented lens 4sm includes, in order from the object side to the image side, the fourth lens 4R having negative refractive power near the optical axis and the first lens 12 (fifth lens 4B) having negative refractive power near the optical axis. The first lens 12 and the fourth lens 4R have Abbe numbers different from each other and refractive powers different from each other.

The first lens 12 has positive refractive power in an area of 70% of the effective diameter. The fourth lens 4R has negative refractive power in an area of 70% of the effective diameter. The fourth lens 4R is formed on the surface on the image side of the first substrate 11 using the wafer level process. The first lens 12 is closely cemented with the surface on the image side of the fourth lens 4R using the wafer level process.

The second unit L2 includes the second substrate 21, the second lens 22 disposed on the object side of the second substrate 21, and the aperture stop SP disposed on the image side of the second substrate 21. The second lens 22 is a positive lens with a convex surface facing the object side, and is formed on the surface on the object side of the second substrate 21 using the wafer level process. The third unit L3 includes the third substrate 31, the third lens 32 disposed on the image side of the third substrate 31, the fourth substrate 41 as a back cover glass, and the fifth substrate 51 as a sensor cover glass. The third lens 32 is a positive lens having a convex surface facing the image side, and is formed on the surface on the image side of the third substrate 31 using the wafer level process. The second unit and the third unit are cemented via the surface on the image side of the second substrate 21 and the surface on the object side of the third substrate 31.

The optical system 1g according to this example is designed to focus on an object located 5 mm from a surface closest to the object of the first unit L1. The optical system 1g is a very small, bright, and wide-angle optical system that has a half angle of view of 59.0° and an F-number of 2.8.

Figures 14A, 14B, 14C, 14D:
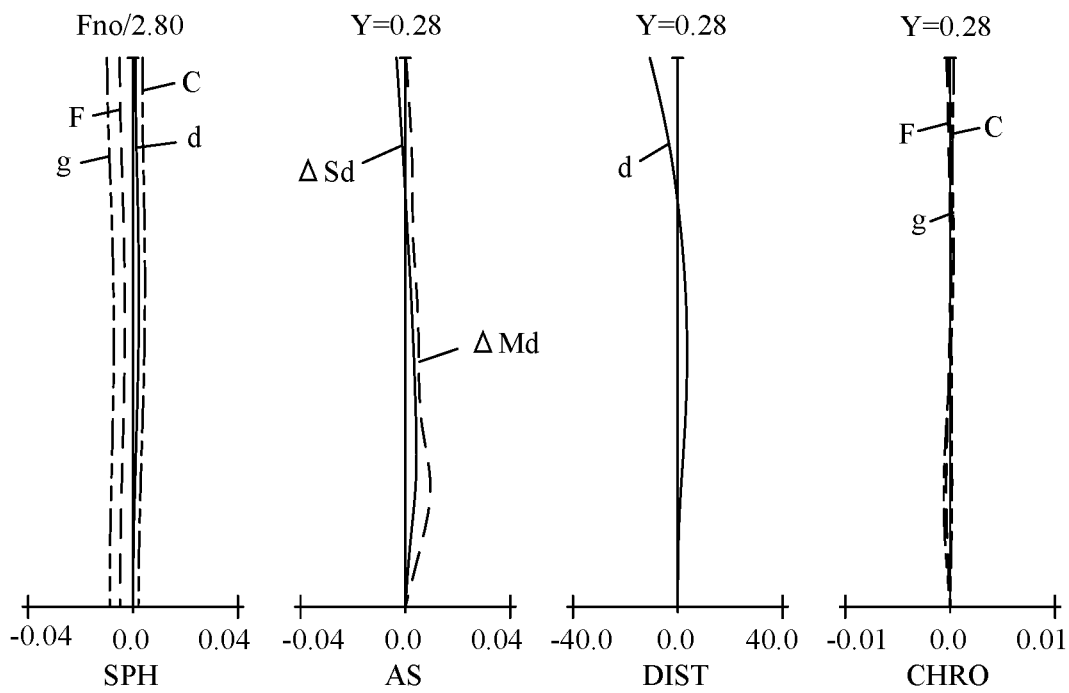
FIGS. 14A to 14D are aberration diagrams of an optical system according to Example 7.

FIGS. 14A to 14D illustrate aberration diagrams of the optical system 1g according to this example. As illustrated in FIG. 14A, a spherical aberration amount in this example is smaller than 0.04 mm. As illustrated in FIG. 14B, an astigmatism amount in this example is smaller than 0.04 mm. As illustrated in FIG. 14C, a distortion amount in this example is smaller than 40%. As illustrated in FIG. 14D, a lateral chromatic aberration amount in this example is smaller than 0.01 mm.

As described above, the optical system 1g according to this example includes the cemented lens 4sm, and is a small, bright, and wide-angle optical system in which a variety of aberrations are satisfactorily corrected from an on-axis light beam to an off-axis light beam.

Example 8

Referring now to FIGS. 15 and 16A to 16D, a description will be given of the optical system 1h according to Example 8 (numerical example 8).

Figure 15:
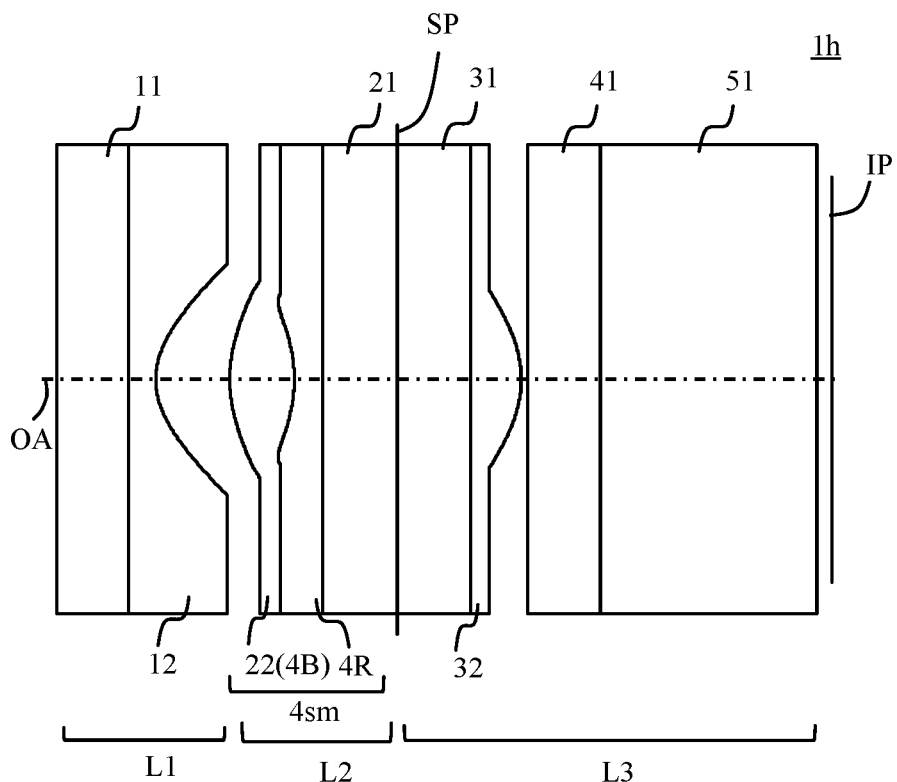
FIG. 15 is a sectional view of an optical system according to Example 8.

As illustrated in FIG. 15, the optical system 1h includes a plurality of units. The lens units consist of the first unit L1, the second unit L2, and the third unit L3. The first unit L1 includes the first substrate (front cover glass) 11 and the first lens 12 disposed on the image side of the first substrate 11. The first lens 12 is a negative lens with a concave surface facing the image side, and is formed on the surface on the image side of the first substrate 11 using the wafer level process. The second unit L2 includes the second substrate 21, the cemented lens 4sm disposed on the object side of the second substrate 21, and the aperture stop SP disposed on the image side of the second substrate 21.

The cemented lens 4sm includes, in order from the object side to the image side, the second lens 22 (fifth lens 4B) having positive refractive power near the optical axis and the fourth lens 4R having negative refractive power near the optical axis. The second lens 22 and the fourth lens 4R have Abbe numbers different from each other and refractive powers different from each other.

The second lens 22 has positive refractive power in an area of 70% of the effective diameter. The fourth lens 4R has negative refractive power in an area of 70% of the effective diameter. The fourth lens 4R is formed on the surface on the object side of the second substrate 21 using the wafer level process. The second lens 22 is closely cemented with the surface on the object side of the fourth lens 4R using the wafer level process.

The third unit L3 includes the third substrate 31, the third lens 32 disposed on the image side of the third substrate 31, the fourth substrate 41 as a back cover glass, and the fifth substrate 51 as a sensor cover glass. The third lens 32 is a positive lens having a convex surface facing the image side, and is formed on the surface on the image side of the third substrate 31 using the wafer level process. The second unit and the third unit are cemented via the surface on the image side of the second substrate 21 and the surface on the object side of the third substrate 31.

The optical system 1h according to this example is designed to focus on an object located 5 mm from the surface closest to the object of the first unit L1. The optical system 1h is a very small, bright, and wide-angle optical system that has a half angle of view of 58.6° and an F-number of 2.8.

Figures 16A, 16B, 16C, 16D:
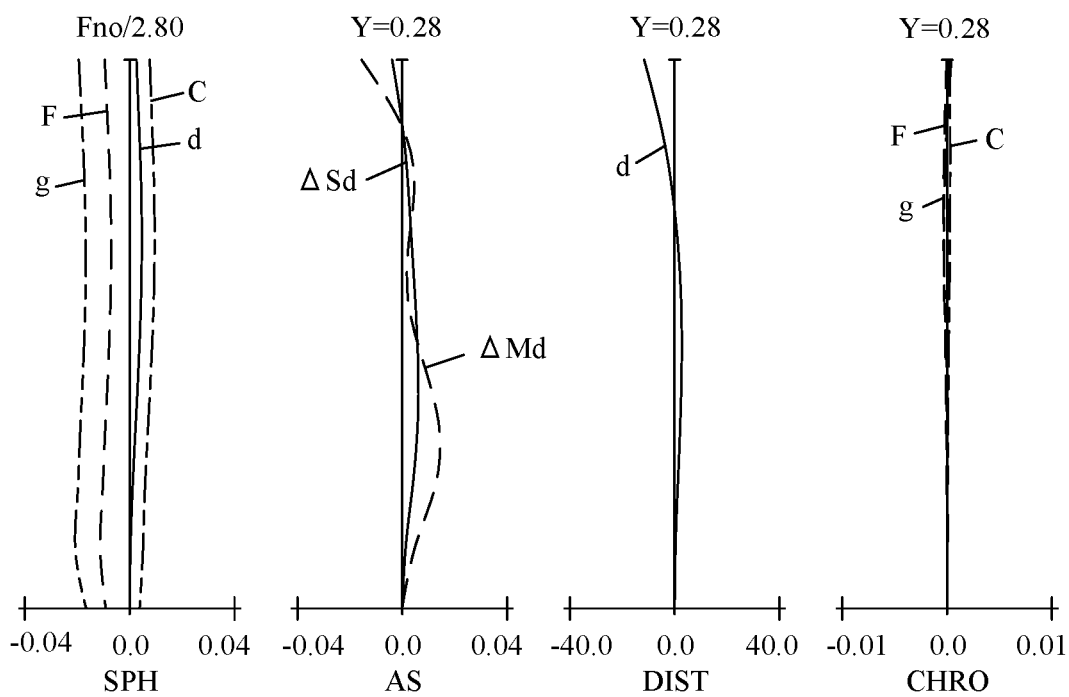
FIGS. 16A to 16D are aberration diagrams of the optical system according to Example 8.

FIGS. 16A to 16D illustrate aberration diagrams of the optical system 1h according to this example. As illustrated in FIG. 16A, a spherical aberration amount in this example is smaller than 0.04 mm. As illustrated in FIG. 16B, an astigmatism amount in this example is smaller than 0.04 mm. As illustrated in FIG. 16C, a distortion amount in this example is smaller than 40%. As illustrated in FIG. 16D, a lateral chromatic aberration amount in this example is smaller than 0.01 mm.

As described above, the optical system 1h according to this example includes the cemented lens 4sm, and is a small, bright, and wide-angle optical system in which a variety of aberrations are satisfactorily corrected from an on-axis light beam to an off-axis light beam.

Example 9

Referring now to FIGS. 17 and 18A to 18D, a description will now be given of the optical system 1i according to Example 7 (numerical example 7).

Figure 17:
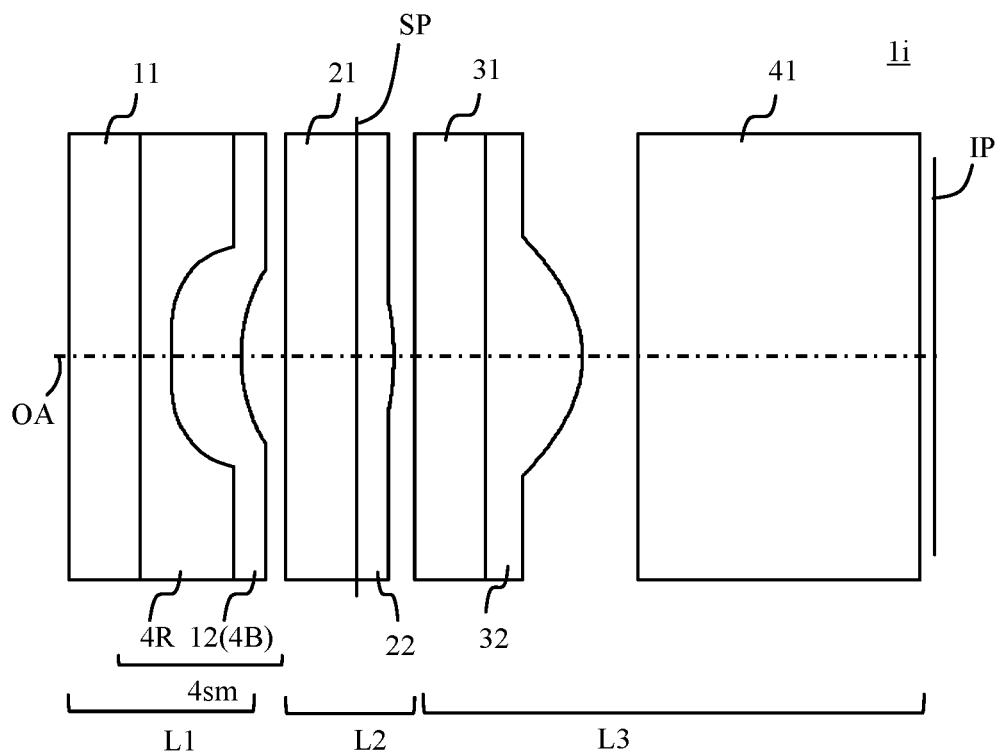
FIG. 17 is a sectional view of an optical system according to Example 9.

As illustrated in FIG. 17, the optical system 1i includes a plurality of units. The plurality of units consist of the first unit L1, the second unit L2, and the third unit L3. The first unit L1 includes the first substrate (front cover glass) 11 and the cemented lens 4sm disposed on the image side of the first substrate 11.

The cemented lens 4sm includes, in order from the object side to the image side, the fourth lens 4R having positive refractive power near the optical axis and the first lens 12 (fifth lens 4B) having negative refractive power near the optical axis. The first lens 12 and the fourth lens 4R have Abbe numbers different from each other and refractive powers different from each other.

The first lens 12 has negative refractive power in an area of 70% of the effective diameter. The fourth lens 4R has negative refractive power in an area of 70% of the effective diameter. The fourth lens 4R is formed on the surface on the image side of the first substrate 11 using the wafer level process. The first lens 12 is closely cemented with the surface on the image side of the fourth lens 4R using the wafer level process.

The second unit L2 includes the second substrate 21, the second lens 22 disposed on the image side thereof, and the aperture stop SP disposed on the image side of the second substrate 21. The second lens 22 is a positive lens having a convex surface facing the image side, and is formed on the surface on the image side of the second substrate 21 using the wafer level process. The third unit L3 includes the third substrate 31, the third lens 32 disposed on the image side of the third substrate 31, and the fourth substrate 41 serving both as a back cover glass and a sensor cover glass. The third lens 32 is a positive lens having a convex surface facing the image side, and is formed on the surface on the image side of the third substrate 31 using the wafer level process.

The optical system 1i according to this example is designed to focus on an object located 5 mm from the surface closest to the object of the first unit L1. The optical system 1i is a very small, bright, and wide-angle optical system that has a half angle of view of 59.1° and an F-number of 2.9.

Figures 18A, 18B, 18C, 18D:
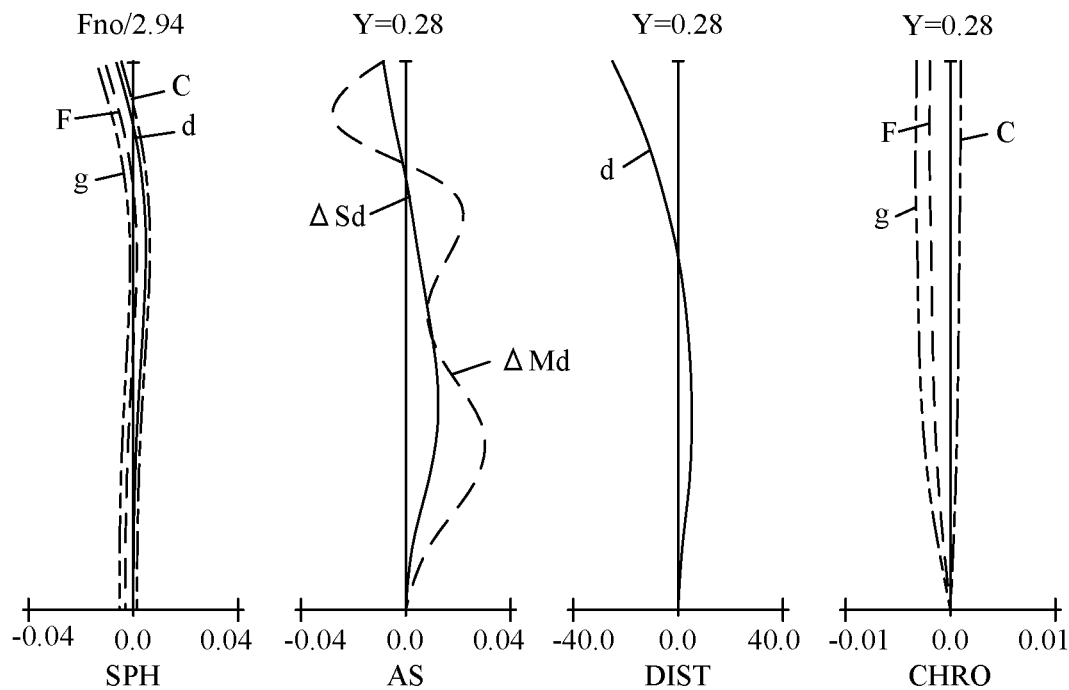
FIGS. 18A to 18D are aberration diagrams of the optical system according to Example 9.

FIGS. 18A to 18D illustrate aberration diagrams of the optical system 1*i* according to this example. As illustrated in FIG. 18A, a spherical aberration amount in this example is smaller than 0.04 mm. As illustrated in FIG. 18B, an astigmatism amount in this example is smaller than 0.04 mm. As illustrated in FIG. 18C, a distortion amount in this example is smaller than 40%. As illustrated in FIG. 18D, a lateral chromatic aberration amount in this example is smaller than 0.01 mm.

As described above, the optical system 1*i* according to this example includes the cemented lens 4*sm*, and is a small, bright, and wide-angle optical system in which a variety of aberrations are satisfactorily corrected from an on-axis light beam to an off-axis light beam.

Example 10

Referring now to FIGS. 19 and 20A to 20D, a description will be given of the optical system 1*j* according to Example 10 (numerical Example 10).

Figure 19:
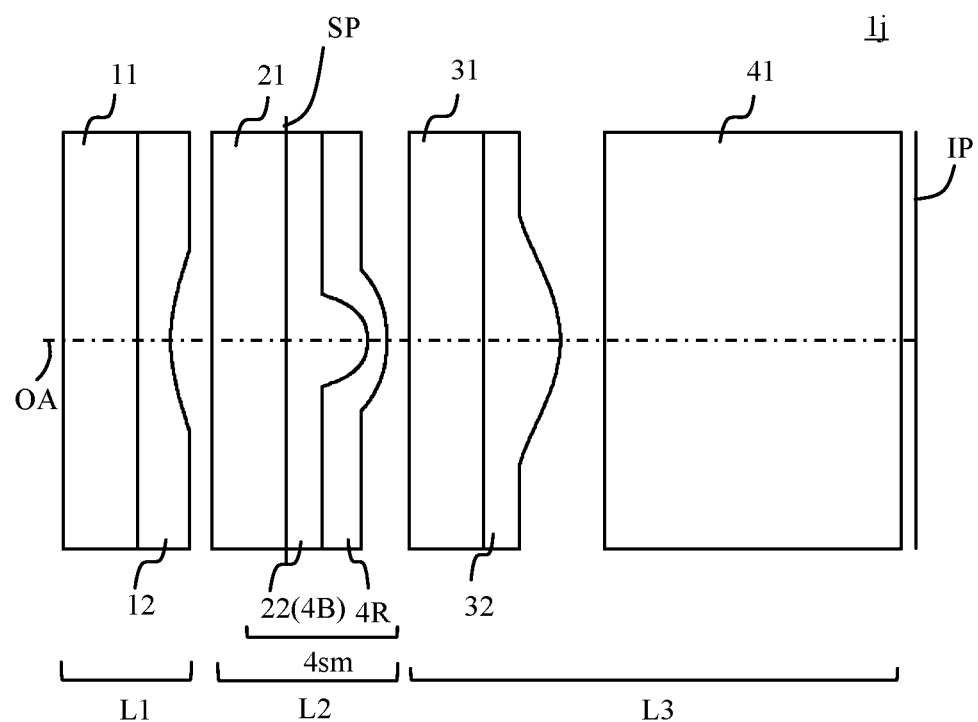
FIG. 19 is a sectional view of an optical system according to Example 10.

As illustrated in FIG. 19, the optical system 1*j* includes a plurality of units. The plurality of units consist of the first unit L1, the second unit L2, and the third unit L3. The first unit L1 includes the first substrate (front cover glass) 11 and the first lens 12 disposed on the image side of the first substrate 11. The first lens 12 is a negative lens with a concave surface facing the image side, and is formed on the surface on the image side of the first substrate 11 using the wafer level process. The second unit L2 includes the second substrate 21, the cemented lens 4*sm* disposed on the image side of the second substrate 21, and the aperture stop SP disposed on the image side of the second substrate 21.

The cemented lens 4*sm* includes, in order from the object side to the image side, the second lens 22 (fifth lens 4B) having positive refractive power near the optical axis and the fourth lens 4R having negative refractive power near the optical axis. The second lens 22 and the fourth lens 4R have Abbe numbers different from each other and refractive powers different from each other.

The second lens 22 has positive refractive power in an area of 70% of the effective diameter. The fourth lens 4R has negative refractive power in an area of 70% of the effective diameter. The second lens 22 is formed on the surface on the image side of the second substrate 21 using the wafer level process. The fourth lens 4R is closely cemented with the surface on the image side of the second lens 22 using the wafer level process. The third unit L3 includes the third substrate 31, a third lens 32 disposed on the image side of the third substrate 31, and the fourth substrate 41 serving as both a back cover glass and a sensor cover glass. The third lens 32 is a positive lens having a convex surface facing the image side, and is formed on the surface on the image side of the third substrate 31 using the wafer level process.

The optical system 1*j* according to this example is designed to focus on an object located 5 mm from the surface closest to the object of the first unit L1. The optical system 1*j* is a very small, bright, and wide-angle optical system that has a half angle of view of 59.0° and an F-number of 2.9.

Figures 20A, 20B, 20C, 20D:
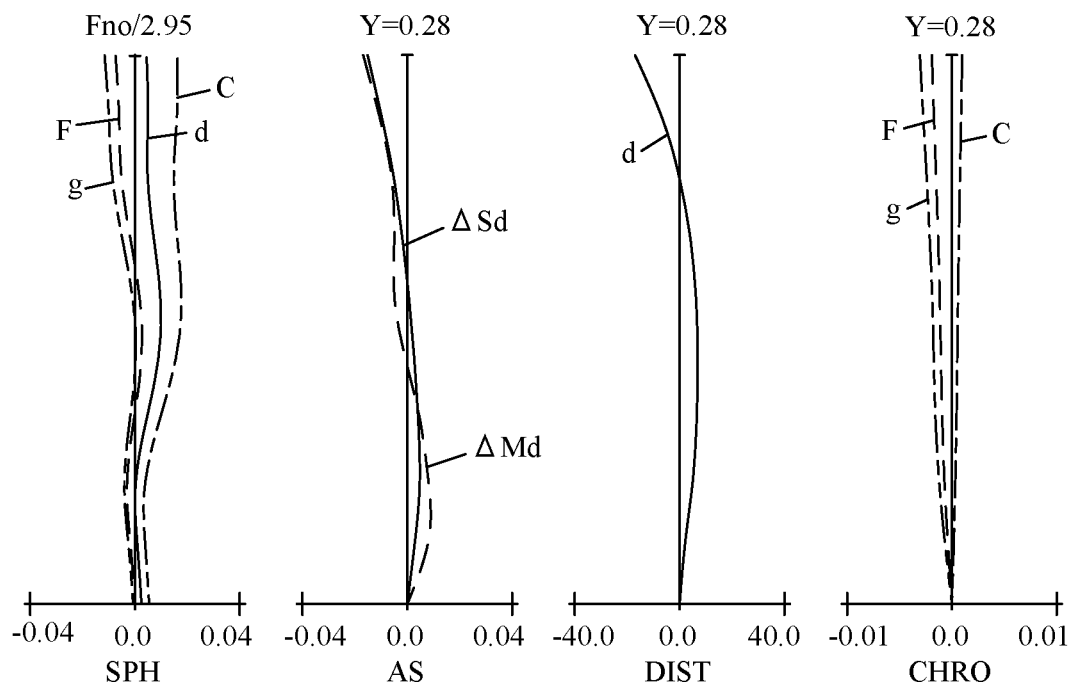
FIGS. 20A to 20D are aberration diagrams of the optical system according to Example 10.

FIGS. 20A to 20D illustrate aberration diagrams of the optical system 1*j* according to this example. As illustrated in FIG. 20A, a spherical aberration amount in this example is smaller than 0.04 mm. As illustrated in FIG. 20B, an astigmatism amount in this example is smaller than 0.04 mm. As illustrated in FIG. 20C, a distortion amount in this example is smaller than 40%. As illustrated in FIG. 20D, a lateral chromatic aberration amount in this example is smaller than 0.01 mm.

As described above, the optical system 1*j* according to this example has the cemented lens 4*sm*, and is a small, bright, and wide-angle optical system in which a variety of aberrations are satisfactorily corrected from an on-axis light beam to an off-axis light beam.

Numerical examples 1 to 10 corresponding to Examples 1 to 10 will be illustrated below. In each numerical example, r denotes a radius of curvature of an i-th surface counted from the object side (mm), d denotes an on-axis distance between the i-th and (i+1)-th surfaces (mm) from the object side, and nd and vd are a refractive index and an Abbe number for the d-line of the i-th optical member. The Abbe number vd of a certain material is expressed as follows:

$$vd = (Nd-1)/(NF-NC)$$

where Nd, NF, and NC are refractive indexes for the d-line (587.6 nm), the F-line (486.1 nm), and the C-line (656.3 nm) in the Fraunhofer line, respectively.

A focal length f (mm) is a value in a case where the optical system is in an in-focus state on an object at infinity. BF denotes a back focus, which is a distance from a final surface of the optical system to the image plane. An overall lens length is a distance from the first surface to the image plane. An aspherical surface is expressed by adding an asterisk * to the surface number. The aspherical shape is represented by the equation (A). "e±Z" means "×10$^{\pm Z}$."

In each numerical example, the "aperture stop" is the aperture stop SP. An effective diameter indicates a maximum light beam diameter in a case where a light beam that contributes to imaging passes through each surface.

Numerical Example 1

UNIT: mm

Surface Data

| Surface No. | r | d | nd | vd | Effective Diameter |
|---|---|---|---|---|---|
| 1 | ∞ | 0.100 | 1.51680 | 64.2 | 0.54 |
| 2 | ∞ | 0.045 | 1.52290 | 50.3 | 0.40 |
| 3* | 0.0814 | 0.120 | | | 0.23 |
| 4* | 0.1350 | 0.095 | 1.52290 | 50.3 | 0.21 |
| 5 | ∞ | 0.100 | 1.51680 | 64.2 | 0.18 |
| 6(Aperture Stop) | ∞ | 0.034 | | | 0.13 |
| 7* | 0.2293 | 0.110 | 1.52290 | 50.3 | 0.21 |
| 8* | 0.5376 | 0.045 | 1.63000 | 24.0 | 0.23 |
| 9 | ∞ | 0.100 | 1.51680 | 64.2 | 0.29 |
| 10 | ∞ | 0.300 | 1.51680 | 64.2 | 0.35 |
| 11 | ∞ | 0.020 | | | 0.55 |
| Image Plane | ∞ | | | | |

Aspheric Data

3rd Surface

K = −9.05286e+00, A4 = 1.11029e+03, A6 = −2.41067e+05,
A8 = 3.64355e+07, A10 = −3.27768e+09, A12 = 1.57316e+11,
A14 = −3.06672e+12

4th Surface

K = −5.17841e+00, A4 = 1.83640e+02, A6 = −7.86697e+03,
A8 = −1.19106e+06, A10 = 3.60178e+08, A12 = −3.52832e+10,
A14 = 1.23061e+12

-continued

UNIT: mm

7th Surface

K = −4.42195e+01, A4 = 2.95388e+02, A6 = −5.30900e+04,
A8 = 5.75919e+06, A10 = −3.27378e+08, A12 = 7.32429e+09,
A14 = −4.91577e+07
8th Surface K = 1.07888e+00, A4 = −4.20373e+02, A6 = 2.28647e+04,
A8 = −1.94505e+06, A10 = 6.62151e+07, A12 = −2.71527e+03

| | |
|---|---|
| Focal Length | 0.217 |
| FNo | 2.83 |
| Half Angle of View | 59.63 |
| Image Height | 0.280 |
| Overall Lens Length | 1.070 |
| BF | 0.020 |

Numerical Example 2

UNIT: mm

Surface Data

| Surface No. | r | d | nd | vd | Effective Diameter |
|---|---|---|---|---|---|
| 1 | ∞ | 0.100 | 1.51680 | 64.2 | 0.58 |
| 2 | ∞ | 0.045 | 1.52290 | 50.3 | 0.44 |
| 3* | 0.0879 | 0.120 | | | 0.25 |
| 4* | 0.1377 | 0.133 | 1.52290 | 50.3 | 0.24 |
| 5 | ∞ | 0.100 | 1.51680 | 64.2 | 0.19 |
| 6 (Aperture Stop) | ∞ | 0.038 | | | 0.13 |
| 7* | 0.2782 | 0.045 | 1.63000 | 24.0 | 0.23 |
| 8* | −0.6263 | 0.093 | 1.52290 | 50.3 | 0.28 |
| 9 | ∞ | 0.100 | 1.51680 | 64.2 | 0.30 |
| 10 | ∞ | 0.300 | 1.51680 | 64.2 | 0.36 |
| 11 | ∞ | 0.020 | | | 0.55 |
| Image Plane | ∞ | | | | |

Aspheric Data

3rd Surface

K = −9.01617e+00, A4 = 8.79331e+02, A6 = −1.58823e+05,
A8 = 1.94562e+07, A10 = −1.41225e+09, A12 = 5.48116e+10,
A14 = −8.68538e+11
4th Surface K = −3.18868e+00, A4 = 1.20671e+02, A6 = −1.02991e+04,
A8 = 1.06647e+06, A10 = −5.74328e+07, A12 = 6.27744e+08,
A14 = 3.38861e+10
7th Surface K = −3.76673e+01, A4 = 2.48626e+02, A6 = −3.49626e+04,
A8 = 2.98260e+06, A10 = −1.84831e+08, A12 = 9.36625e+09,
A14 = −2.68131e+11
8th Surface K = −9.70734e+22, A4 = 7.33875e+02, A6 = −5.76856e+04,
A8 = 4.40940e+05, A10 = 1.84269e+08, A12 = −9.29382e+09,
A14 = 1.19839e+11

| | |
|---|---|
| Focal Length | 0.224 |
| FNo | 2.83 |
| Half Angle of View | 58.99 |
| Image Height | 0.280 |
| Overall Lens Length | 1.093 |
| BF | 0.020 |

Numerical Example 3

UNIT: mm

Surface Data

| Surface No. | r | d | nd | vd | Effective Diameter |
|---|---|---|---|---|---|
| 1 | ∞ | 0.240 | 1.51680 | 64.2 | 2.26 |
| 2 | ∞ | 0.200 | 1.52290 | 50.3 | 1.93 |
| 3* | 0.2609 | 0.350 | | | 1.12 |
| 4* | 0.3186 | 0.363 | 1.52290 | 50.3 | 0.84 |
| 5 | ∞ | 0.300 | 1.51680 | 64.2 | 0.69 |
| 6 (Aperture Stop) | ∞ | 0.147 | | | 0.28 |
| 7* | 0.5939 | 0.050 | 1.63000 | 24.0 | 0.91 |
| 8* | 0.3208 | 0.424 | 1.52290 | 50.3 | 1.08 |
| 9 | ∞ | 0.300 | 1.51680 | 64.2 | 1.14 |
| 10 | ∞ | 0.300 | 1.51680 | 64.2 | 1.39 |
| 11 | ∞ | 0.020 | | | 1.64 |
| Image Plane | ∞ | | | | |

Aspheric Data

3rd Surface

K = −1.73945e+00, A4 = 2.55076e+00, A6 = −1.55852e+01,
A8 = 5.63286e+01, A10 = −2.01179e+02, A12 = 4.31905e+02,
A14 = −3.57624e+02
4th Surface K = −3.19350e+00, A4 = 8.26777e+00, A6 = −8.19479e+01,
A8 = 7.54371e+02, A10 = −5.09583e+03, A12 = 1.78101e+04,
A14 = −2.44071e+04
7th Surface K = −2.31968e+01, A4 = 6.57776e+00, A6 = −9.94286e+01,
A8 = 7.52174e+02, A10 = −2.79487e+03, A12 = 4.36910e+03,
A14 = −1.41223e+03
8th Surface K = −1.07182e+00, A4 = 7.01018e+00, A6 = −1.29129e+02,
A8 = 7.83284e+02, A10 = −2.07389e+03, A12 = 1.99522e+03,
A14 = 5.96501e+01

| | |
|---|---|
| Focal Length | 0.584 |
| FNo | 2.88 |
| Half Angle of View | 58.99 |
| Image Height | 0.820 |
| Overall Lens Length | 2.695 |
| BF | 0.020 |

Numerical Example 4

UNIT: mm

Surface Data

| Surface No. | r | d | nd | vd | Effective Diameter |
|---|---|---|---|---|---|
| 1 | ∞ | 0.100 | 1.51680 | 64.2 | 0.66 |
| 2 | ∞ | 0.045 | 1.52290 | 50.3 | 0.52 |
| 3* | 1.1110 | 0.035 | 1.63000 | 24.0 | 0.31 |
| 4* | 0.1177 | 0.130 | | | 0.28 |
| 5* | 0.1338 | 0.119 | 1.52290 | 50.3 | 0.21 |
| 6 | ∞ | 0.100 | 1.51680 | 64.2 | 0.17 |
| 7 (Aperture Stop) | ∞ | 0.053 | | | 0.11 |
| 8* | 0.2364 | 0.068 | 1.52290 | 50.3 | 0.26 |
| 9 | ∞ | 0.100 | 1.51680 | 64.2 | 0.29 |
| 10 | ∞ | 0.300 | 1.51680 | 64.2 | 0.35 |
| 11 | ∞ | 0.020 | | | 0.56 |
| Image Plane | ∞ | | | | |

-continued

UNIT: mm

Aspheric Data

3rd Surface

K = 4.34938e+01, A4 = −3.46661e+01, A6 = 9.70226e+04,
A8 = −1.33543e+07, A10 = 8.47604e+08, A12 = −2.52180e+10,
A14 = 2.77359e+11
4th Surface K = −1.91555e+01, A4 = 6.74896e+02, A6 = −8.57074e+04,
A8 = 7.38633e+06, A10 = −3.82658e+08, A12 = 1.08650e+10,
A14 = −1.33472e+11
5th Surface K = −7.65600e+00, A4 = 3.32416e+02, A6 = −4.71671e+04,
A8 = 6.29776e+06, A10 = −5.92395e+08, A12 = 3.21338e+10,
A14 = −7.47792e+11
8th Surface K = −7.54882e+01, A4 = 2.56483e+02, A6 = −5.59008e+04,
A8 = 7.18290e+06, A10 = −5.22184e+08, A12 = 1.97653e+10,
A14 = −3.01523e+11

| | |
|---|---|
| Focal Length | 0.224 |
| FNo | 2.83 |
| Half Angle of View | 59.00 |
| Image Height | 0.280 |
| Overall Lens Length | 1.070 |
| BF | 0.020 |

Numerical Example 5

UNIT: mm

Surface Data

| Surface No. | r | d | nd | vd | Effective Diameter |
|---|---|---|---|---|---|
| 1 | ∞ | 0.100 | 1.51680 | 64.2 | 0.65 |
| 2 | ∞ | 0.025 | 1.51100 | 57.0 | 0.51 |
| 3* | 0.0976 | 0.117 | | | 0.30 |
| 4* | 0.1719 | 0.087 | 1.59000 | 31.0 | 0.27 |
| 5 | ∞ | 0.100 | 1.51680 | 64.2 | 0.24 |
| 6 (Aperture Stop) | ∞ | 0.100 | 1.51680 | 64.2 | 0.13 |
| 7 | ∞ | 0.090 | 1.51100 | 57.0 | 0.13 |
| 8* | −0.1320 | 0.030 | 1.63000 | 24.0 | 0.17 |
| 9* | −0.1789 | 0.080 | | | 0.22 |
| 10 | ∞ | 0.100 | 1.51680 | 64.2 | 0.32 |
| 11 | ∞ | 0.300 | 1.51680 | 64.2 | 0.38 |
| 12 | ∞ | 0.021 | | | 0.55 |
| Image Plane | ∞ | | | | |

Aspheric Data

3rd Surface

K = −1.52850e+00, A4 = 7.05541e+01, A6 = −4.76384e+02,
A8 = −3.59197e+04, A10 = 2.57289e+06, A12 = −5.55384e+07
4th Surface K = −9.72216e−01, A4 = −1.23157e+01, A6 = 2.66694e+03,
A8 = −2.62236e+05, A10 = 1.27756e+07, A12 = −2.54287e+08
8th Surface K = 9.48682e−01, A4 = −1.60743e+02, A6 = −1.79558e+04,
A8 = −2.14381e+06, A10 = 4.38554e+08, A12 = −3.64264e+10
9th Surface K = 1.16667e+00, A4 = 3.95314e+01, A6 = −1.02951e+04,
A8 = 1.83106e+06, A10 = −1.35474e+08, A12 = 4.97126e+09

-continued

UNIT: mm

| | |
|---|---|
| Focal Length | 0.228 |
| FNo | 2.80 |
| Half Angle of View | 58.60 |
| Image Height | 0.280 |
| Overall Lens Length | 1.149 |
| BF | 0.021 |

Numerical Example 6

UNIT: mm

Surface Data

| Surface No. | r | d | nd | vd | Effective Diameter |
|---|---|---|---|---|---|
| 1 | ∞ | 0.100 | 1.51680 | 64.2 | 0.63 |
| 2 | ∞ | 0.025 | 1.52290 | 50.3 | 0.50 |
| 3* | 0.0953 | 0.116 | | | 0.31 |
| 4* | 0.1641 | 0.089 | 1.59000 | 31.0 | 0.28 |
| 5 | ∞ | 0.102 | 1.51680 | 64.2 | 0.25 |
| 6 | ∞ | 0.102 | 1.51680 | 64.2 | 0.15 |
| 7 (Aperture Stop) | ∞ | 0.030 | 1.63300 | 23.3 | 0.13 |
| 8* | 0.0901 | 0.110 | 1.69000 | 35.0 | 0.20 |
| 9* | −0.3208 | 0.048 | | | 0.23 |
| 10 | ∞ | 0.100 | 1.51680 | 64.2 | 0.30 |
| 11 | ∞ | 0.300 | 1.51680 | 64.2 | 0.36 |
| 12 | ∞ | 0.020 | | | 0.55 |
| Image Plane | ∞ | | | | |

Aspheric Data

3rd Surface

K = −2.51230e+00, A4 = 1.50191e+02, A6 = −5.41471e+03,
A8 = 8.59473e+04, A10 = 2.08109e+06, A12 = −6.15035e+07
4th Surface K = −2.57106e+00, A4 = 3.13721e+01, A6 = 5.22013e+02,
A8 = −1.34901e+05, A10 = 7.80377e+06, A12 = −1.52685e+08
8th Surface K = −3.18691e−01, A4 = −1.97315e+02, A6 = −1.82279e+03,
A8 = −1.67855e+06, A10 = 2.82214e+08, A12 = −2.05717e+10
9th Surface K = 5.11486e+00, A4 = 5.54827e+01, A6 = −2.90091e+03,
A8 = 5.31654e+05, A10 = −3.70522e+07, A12 = 1.24796e+09

| | |
|---|---|
| Focal Length | 0.220 |
| FNo | 2.79 |
| Half Angle of View | 59.00 |
| Image Height | 0.280 |
| Overall Lens Length | 1.143 |
| BF | 0.020 |

Numerical Example 7

UNIT: mm

Surface Data

| Surface No. | r | d | nd | vd | Effective Diameter |
|---|---|---|---|---|---|
| 1 | ∞ | 0.100 | 1.51680 | 64.2 | 0.66 |
| 2 | ∞ | 0.041 | 1.52290 | 50.3 | 0.52 |
| 3* | 0.2465 | 0.050 | 1.63000 | 24.0 | 0.32 |

-continued

UNIT: mm

| | | | | | |
|---|---|---|---|---|---|
| 4* | 0.1028 | 0.080 | | | 0.29 |
| 5* | 0.1425 | 0.064 | 1.59000 | 31.0 | 0.23 |
| 6 | ∞ | 0.102 | 1.51680 | 64.2 | 0.19 |
| 7 (Aperture Stop) | ∞ | 0.102 | 1.51680 | 64.2 | 0.10 |
| 8 | ∞ | 0.070 | 1.52290 | 50.3 | 0.21 |
| 9* | −0.1428 | 0.009 | | | 0.24 |
| 10 | ∞ | 0.100 | 1.51680 | 64.2 | 0.30 |
| 11 | ∞ | 0.254 | 1.51680 | 64.2 | 0.37 |
| 12 | ∞ | 0.020 | | | 0.55 |
| Image Plane | ∞ | | | | |

Aspheric Data

3rd Surface $K = -4.61324e-02$, $A4 = 3.75925e+02$, $A6 = -1.37514e+04$,
$A8 = 5.67395e+05$, $A10 = -3.42776e+07$, $A12 = 5.79769e+08$ 4th Surface $K = -2.18853e+00$, $A4 = 2.16476e+02$, $A6 = -1.68891e+04$,
$A8 = 3.81220e+05$, $A10 = 8.71747e+05$, $A12 = -1.48286e+08$ 5th Surface $K = -9.42320e+00$, $A4 = 2.98735e+02$, $A6 = -4.17697e+04$,
$A8 = 3.28692e+06$, $A10 = -1.67034e+08$, $A12 = 3.76355e+09$ 9th Surface $K = 8.35618e-02$, $A4 = 1.00261e+02$, $A6 = -5.63149e+03$,
$A8 = 1.08499e+06$, $A10 = -6.72626e+07$, $A12 = 1.96066e+09$

| | |
|---|---|
| Focal Length | 0.188 |
| FNo | 2.80 |
| Half Angle of View | 59.00 |
| Image Height | 0.280 |
| Overall Lens Length | 0.993 |
| BF | 0.020 |

Numerical Example 8

UNIT: mm

Surface Data

| Surface No. | r | d | nd | vd | Effective Diameter |
|---|---|---|---|---|---|
| 1 | ∞ | 0.100 | 1.51680 | 64.2 | 0.65 |
| 2 | ∞ | 0.037 | 1.51100 | 57.0 | 0.51 |
| 3* | 0.1023 | 0.102 | | | 0.32 |
| 4* | 0.1921 | 0.089 | 1.59000 | 31.0 | 0.27 |
| 5* | −0.2114 | 0.040 | 1.51100 | 57.0 | 0.24 |
| 6 | ∞ | 0.102 | 1.51680 | 64.2 | 0.16 |
| 7 (Aperture Stop) | ∞ | 0.102 | 1.51680 | 64.2 | 0.11 |
| 8 | ∞ | 0.070 | 1.51100 | 57.0 | 0.21 |
| 9* | −0.1525 | 0.009 | | | 0.24 |
| 10 | ∞ | 0.100 | 1.51680 | 64.2 | 0.30 |
| 11 | ∞ | 0.300 | 1.51680 | 64.2 | 0.36 |
| 12 | ∞ | 0.020 | | | 0.55 |
| Image Plane | ∞ | | | | |

Aspheric Data

3rd Surface $K = -1.91221e+00$, $A4 = 5.30807e+01$, $A6 = -1.86119e+03$,
$A8 = -6.78150e+04$, $A10 = 5.22275e+06$, $A12 = -7.90975e+07$ 4th Surface $K = -7.86472e+00$, $A4 = 7.69781e+01$, $A6 = -5.49069e+03$,
$A8 = 9.12301e+03$, $A10 = 1.44189e+07$, $A12 = -3.17442e+08$ -continued UNIT: mm 5th Surface $K = -1.42474e+01$, $A4 = -8.94822e+01$, $A6 = -1.80683e+04$,
$A8 = 4.54821e+06$, $A10 = -3.29958e+08$, $A12 = 9.43633e+09$ 9th Surface $K = 2.85911e-01$, $A4 = 8.39157e+01$, $A6 = -5.66271e+03$,
$A8 = 1.14875e+06$, $A10 = -7.76388e+07$, $A12 = 2.37854e+09$

| | |
|---|---|
| Focal Length | 0.192 |
| FNo | 2.80 |
| Half Angle of View | 58.60 |
| Image Height | 0.280 |
| Overall Lens Length | 1.072 |
| BF | 0.020 |

Numerical Example 9

UNIT: mm

Surface Data

| Surface No. | r | d | nd | vd | Effective Diameter |
|---|---|---|---|---|---|
| 1 | ∞ | 0.100 | 1.51680 | 64.2 | 0.63 |
| 2 | ∞ | 0.045 | 1.52000 | 47.0 | 0.49 |
| 3* | −0.9279 | 0.098 | 1.63000 | 24.0 | 0.31 |
| 4* | 0.2679 | 0.063 | | | 0.24 |
| 5 | ∞ | 0.100 | 1.51680 | 64.2 | 0.19 |
| 6 (Aperture Stop) | ∞ | 0.052 | 1.52000 | 47.0 | 0.10 |
| 7* | −0.4292 | 0.030 | | | 0.15 |
| 8 | ∞ | 0.100 | 1.51680 | 64.2 | 0.21 |
| 9 | ∞ | 0.137 | 1.52000 | 47.0 | 0.29 |
| 10* | −0.1556 | 0.078 | | | 0.34 |
| 11 | ∞ | 0.400 | 1.51680 | 64.2 | 0.43 |
| 12 | ∞ | 0.020 | | | 0.57 |
| Image Plane | ∞ | | | | |

Aspheric Data

3rd Surface $K = 8.92526e+00$, $A4 = 3.22132e+02$, $A6 = -2.77789e+04$,
$A8 = 2.38806e+06$, $A10 = -1.15657e+08$, $A12 = 2.23681e+09$ 4th Surface $K = -4.68602e+01$, $A4 = 2.95948e+02$, $A6 = -3.70873e+04$,
$A8 = 2.68637e+06$, $A10 = -9.25452e+07$, $A12 = 1.17487e+09$ 7th Surface $K = 1.64987e+01$, $A4 = 9.83713e+00$, $A6 = 2.85516e+04$,
$A8 = -1.48153e+07$, $A10 = 3.03313e+09$, $A12 = -2.24996e+11$ 10th Surface $K = -5.25306e+00$, $A4 = -8.76883e+01$, $A6 = 2.41107e+03$,
$A8 = 1.26015e+04$, $A10 = -2.77019e+06$, $A12 = 5.18753e+07$

| | |
|---|---|
| Focal Length | 0.226 |
| FNo | 2.94 |
| Half Angle of View | 59.09 |
| Image Height | 0.280 |
| Overall Lens Length | 1.224 |
| BF | 0.020 |

Numerical Example 10

UNIT: mm

Surface Data

| Surface No. | r | d | nd | vd | Effective Diameter |
|---|---|---|---|---|---|
| 1 | ∞ | 0.100 | 1.51680 | 64.2 | 0.48 |
| 2 | ∞ | 0.045 | 1.52000 | 47.0 | 0.34 |
| 3* | 0.2043 | 0.055 | | | 0.24 |
| 4 | ∞ | 0.100 | 1.51680 | 64.2 | 0.18 |
| 5 (Aperture Stop) | ∞ | 0.110 | 1.52000 | 47.0 | 0.09 |
| 6* | −0.0745 | 0.026 | 1.63000 | 24.0 | 0.12 |
| 7* | −0.2280 | 0.030 | | | 0.19 |
| 8 | ∞ | 0.100 | 1.51680 | 64.2 | 0.25 |
| 9 | ∞ | 0.103 | 1.52000 | 47.0 | 0.31 |
| 10* | −0.1605 | 0.059 | | | 0.34 |
| 11 | ∞ | 0.400 | 1.51680 | 64.2 | 0.40 |
| 12 | ∞ | 0.020 | | | 0.56 |
| Image Plane | ∞ | | | | |

Aspheric Data

3rd Surface

K = −1.31797e+01, A4 = 5.73914e+01, A6 = −8.07855e+03,
A8 = 7.23834e+05, A10 = −3.51063e+07, A12 = 6.96366e+08

6th Surface

K = −2.24008e+01, A4 = −7.63948e+03, A6 = 3.57919e+06,
A8 = −1.23628e+09, A10 = 2.00857e+11, A12 = −1.25481e+13

7th Surface

K = 1.43707e+00, A4 = −4.26973e+02, A6 = 1.00968e+05,
A8 = −1.75134e+07, A10 = 1.60540e+09, A12 = −5.79159e+10

10th Surface

K = −7.97099e+00, A4 = −1.15794e+02, A6 = 8.82572e+03,
A8 = −3.21692e+05, A10 = 6.43005e+06, A12 = −5.52479e+07

| | |
|---|---|
| Focal Length | 0.205 |
| FNo | 2.95 |
| Half Angle of View | 59.00 |
| Image Height | 0.280 |
| Overall Lens Length | 1.149 |
| BF | 0.020 |

Tables 1 and 2 illustrate numerical values of inequalities (1) to (11) in each numerical example.

TABLE 1

| | Numerical Example | | | | |
|---|---|---|---|---|---|
| Inequality | 1 | 2 | 3 | 4 | 5 |
| vr | 24 | 50.3 | 24 | 50.3 | 24 |
| vb | 50.3 | 24 | 50.3 | 24 | 57 |
| \| vr − vb \| | 26.3 | 26.3 | 26.3 | 26.3 | 33 |
| dsm | 0.144 | 0.083 | 0.197 | 0.384 | 0.190 |
| f | 0.217 | 0.224 | 0.584 | 0.224 | 0.228 |
| f1 | −0.156 | −0.168 | −0.499 | −0.191 | −0.191 |
| f2 | 0.258 | 0.263 | 0.609 | 0.256 | 0.291 |
| f3 | 0.409 | 0.412 | 1.356 | 0.452 | 0.373 |
| dsm/f | 0.663 | 0.368 | 0.337 | 1.711 | 0.835 |
| r7r1 | −0.3907 | 0.1803 | 0.8239 | ∞ | −0.1078 |
| r7r2 | ∞ | ∞ | 0.4517 | 0.1817 | −0.1742 |
| r7b1 | 0.2534 | 0.2685 | 0.4517 | 0.1817 | ∞ |
| r7b2 | −0.3907 | 0.1803 | ∞ | 0.1336 | −0.1078 |
| f7r | −0.620 | 0.345 | −1.673 | −0.348 | −0.544 |
| f7b | 0.312 | −1.083 | 0.864 | −1.114 | 0.211 |
| fr | 0.853 | −1.198 | −1.191 | −2.125 | −1.064 |
| fb | 0.681 | 0.312 | 0.613 | −0.212 | 0.258 |
| \| f7r/fr − 1 \| | 1.727 | 1.288 | 0.405 | 0.836 | 0.488 |
| \| f7b/fb − 1 \| | 0.542 | 4.475 | 0.408 | 4.258 | 0.183 |
| (4) | 0.0008 | 0.0043 | 0.0011 | 0.0212 | 0.0015 |
| f7sm | 0.546 | 0.559 | 1.876 | −0.246 | 0.387 |
| \| f7sm/f7r \| | −0.881 | 1.620 | −1.121 | 0.708 | −0.711 |
| \| f7sm/f7b \| | 1.750 | −0.516 | 2.172 | 0.221 | 1.833 |
| f2/f | 1.187 | 1.174 | 1.044 | 1.141 | 1.280 |
| f3/f1 | −2.624 | −2.453 | −2.718 | −2.372 | −1.955 |
| (f2 − f1)/f3 | 1.013 | 1.046 | 0.817 | 0.988 | 1.292 |
| f3/f | 1.879 | 1.838 | 2.323 | 2.015 | 1.641 |
| L | 0.420 | 0.420 | 0.620 | 0.400 | 0.500 |
| L/f | 1.931 | 1.872 | 1.062 | 1.783 | 2.198 |
| da1 | 0.316 | 0.353 | 1.014 | 0.349 | 0.303 |
| Yim | 0.28 | 0.28 | 0.82 | 0.28 | 0.28 |
| (11) | −0.807 | −0.946 | −1.057 | −1.059 | −0.909 |

TABLE 2

| | Numerical Example | | | | |
|---|---|---|---|---|---|
| Inequality | 6 | 7 | 8 | 9 | 10 |
| vr | 23.3 | 50.3 | 57 | 47 | 24 |
| vb | 35 | 24 | 31 | 24 | 47 |
| \| vr − vb \| | 11.7 | 26.3 | 26 | 23 | 23 |
| dsm | 0.030 | 0.296 | 0.142 | 0.262 | 0.110 |
| f | 0.220 | 0.188 | 0.192 | 0.226 | 0.205 |
| f1 | −0.182 | −0.178 | −0.200 | −0.402 | −0.393 |
| f2 | 0.278 | 0.242 | 0.296 | 0.825 | 0.740 |
| f3 | 0.371 | 0.273 | 0.298 | 0.299 | 0.309 |
| dsm/f | 0.136 | 1.577 | 0.738 | 1.160 | 0.540 |
| r7r1 | ∞ | ∞ | −0.2244 | ∞ | −0.0552 |
| r7r2 | 0.1089 | 0.1291 | ∞ | 0.3276 | −0.1618 |
| r7b1 | 0.1089 | 0.1291 | 0.2275 | 0.3276 | ∞ |
| r7b2 | −0.3587 | 0.1303 | −0.2244 | 0.2463 | −0.0552 |
| f7r | −0.172 | −0.247 | −0.439 | −0.630 | −0.147 |
| f7b | 0.134 | 1.305 | 0.207 | −2.960 | 0.106 |
| fr | −0.142 | −0.471 | −0.414 | 1.784 | −0.188 |
| fb | 0.114 | −0.324 | 0.186 | 0.320 | 0.143 |
| \| f7r/fr − 1 \| | 0.209 | 0.476 | 0.062 | 1.353 | 0.217 |
| \| f7b/fb − 1 \| | 0.170 | 5.032 | 0.112 | 8.255 | 0.258 |
| (4) | 0.0080 | 0.0091 | 0.0224 | 0.0108 | 0.0171 |
| f7sm | 0.420 | −0.257 | 0.345 | −0.461 | 0.494 |
| \| f7sm/f7r \| | −2.441 | 1.043 | −0.787 | 0.731 | −3.361 |
| \| f7sm/f7b \| | 3.136 | −0.197 | 1.672 | 0.156 | 4.648 |
| f2/f | 1.262 | 1.286 | 1.537 | 3.659 | 3.616 |
| f3/f1 | −2.036 | −1.533 | −1.491 | −0.744 | −0.786 |
| (f2 − f1)/f3 | 1.241 | 1.537 | 1.662 | 4.102 | 3.671 |
| f3/f | 1.683 | 1.455 | 1.550 | 1.327 | 1.508 |
| L | 0.468 | 0.365 | 0.430 | 0.498 | 0.479 |
| L/f | 2.125 | 1.943 | 2.232 | 2.206 | 2.341 |
| da1 | 0.409 | 0.246 | 0.333 | 0.163 | 0.155 |
| Yim | 0.28 | 0.28 | 0.28 | 0.28 | 0.28 |
| (11) | −1.209 | −0.834 | −1.239 | −1.040 | −1.064 |

Example 11

Figure 21:
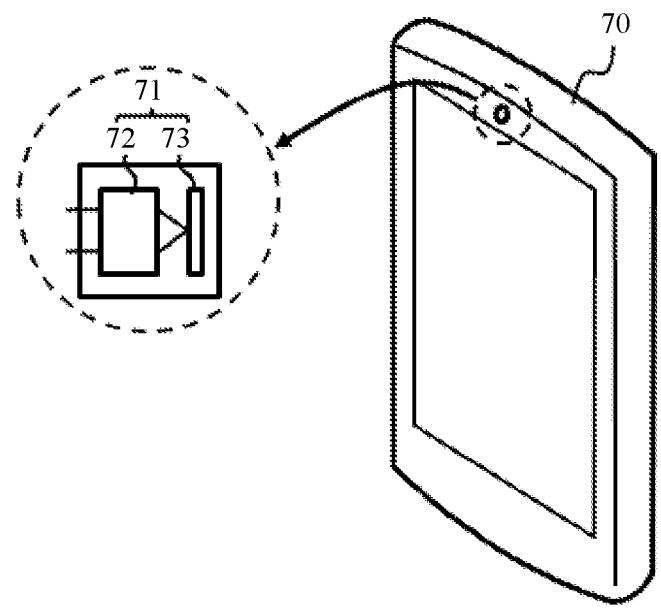
FIG. 21 is a schematic diagram of the principal part of an electronic apparatus according to Example 11.

Referring now to FIG. 21, a description will be given of an electronic apparatus according to Example 11. FIG. 21 is a schematic diagram of the principal part of an electronic apparatus (smartphone 70) according to this example. The smartphone 70 includes an image pickup apparatus 71 as a front camera module. The image pickup apparatus 71 includes an optical system 72 corresponding to the optical system according to any one of Examples 1 to 10 and an image sensor 73 configured to receive an image formed by the optical system 72. Applying the optical system according to each of the above examples to an image pickup apparatus such as a smartphone can realize a small image pickup apparatus having high optical performance.

Example 12

Figure 22:
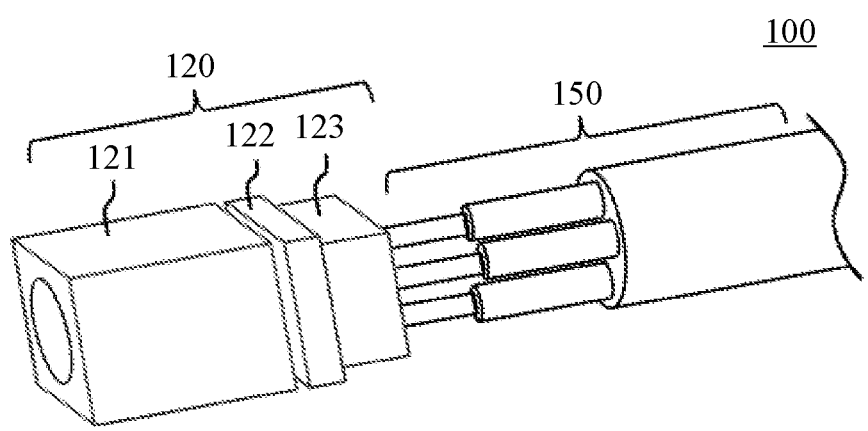
FIG. 22 is a schematic diagram of the principal part of an image pickup apparatus according to Example 12.

Referring now to FIG. 22, a description will be given of an image pickup apparatus according to Example 12. FIG. 22 is a schematic diagram of the principal part of an image pickup apparatus 100 according to this example. The image pickup apparatus 100 is used for a small endoscopes and includes a camera head 120 and an electric cable 150. The camera head 120 includes a lens housing 121 that includes the optical system according to any one of Examples 1 to 10, an image sensor 122, and a ceramic substrate 123. A wiring of an electric cable 150 is connected to the image sensor 122 through the ceramic substrate 123. Thus, applying the optical system according to each example to the image pickup apparatus of the endoscope can realize a small image pickup apparatus having high optical performance.

Each example can provide an optical system and an image pickup apparatus, each of which is small and have high optical performance.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-038524, filed on Mar. 11, 2022, which is hereby incorporated by reference herein in its entirety.

What is claimed is:

1. An optical system comprising a plurality of units, the plurality of units consisting of, in order from an object side to an image side, a first unit, a second unit, and a third unit,
   wherein the first unit includes a first substrate and a first lens having negative refractive power, the first lens being disposed on the image side of the first substrate,
   wherein the second unit includes a second substrate and a second lens having positive refractive power, the second lens being disposed on the object side or image side of the second substrate,
   wherein the third unit includes a third substrate and a third lens having positive refractive power, the third lens being disposed on the object side or image side of the third substrate,
   wherein at least one of the first lens, the second lens, and the third lens constitutes a cemented lens including a fourth lens, and
   wherein the fourth lens and the lens cemented with the fourth lens in the cemented lens have refractive powers different from each other and Abbe numbers different from each other.

2. The optical system according to claim 1, wherein the following inequality is satisfied:

$$8 < |vr - vb| < 60$$

where vr is the Abbe number of the fourth lens, and vb is the Abbe number of the lens cemented with the fourth lens.

3. The optical system according to claim 1, wherein the following inequality is satisfied:

$$0.05 < dsm/f < 2.50$$

where dsm is a distance on an optical axis from a cemented surface of the cemented lens to an aperture stop, and f is a focal length of the optical system.

4. The optical system according to claim 3, wherein the aperture stop is disposed on the second substrate or the third substrate.

5. The optical system according to claim 1, wherein the following inequalities are satisfied:

$$0.05 < |f7r/fr - 1| < 20.00$$

$$0.05 < |f7b/fb - 1| < 20.00$$

where f7r is a focal length in an area of 70% of an effective diameter of the fourth lens, fr is a paraxial focal length in a central area of the effective diameter of the fourth lens, f7b is a focal length in an area of 70% of the effective diameter of the lens cemented with the fourth lens, and fb is a paraxial focal length in a central area of the effective diameter of the lens cemented with the fourth lens.

6. The optical system according to claim 1, wherein the following inequality is satisfied:

$$0.000 < |f/(f7r \times vr) + f/(f7b \times vb)| < 0.050$$

where f7r is a focal length in an area of 70% of an effective diameter of the fourth lens, vr is an Abbe number of the fourth lens, f7b is a focal length in an area of 70% of an effective diameter of the lens cemented with the fourth lens, vb is an Abbe number of the lens cemented with the fourth lens, and f is a focal length of the optical system.

7. The optical system according to claim 1, wherein the following inequalities are satisfied:

$$0.1 < |f7sm/f7r| < 6.0$$

$$0.1 < |f7sm/f7b| < 6.0$$

where f7sm is a focal length in an area of 70% of an effective diameter of the cemented lens, f7r is a focal length in an area of 70% of an effective diameter of the fourth lens, f7b is an effective diameter in an area of 70% of the lens cemented with the fourth lens.

8. The optical system according to claim 1, wherein the following inequality is satisfied:

$$0.7 < f2/f < 5.0$$

where f2 is a focal length of the second unit, and f is a focal length of the optical system.

9. The optical system according to claim 1, wherein the following inequality is satisfied:

$$-4.0 < f3/f1 < -0.3$$

where f1 is a focal length of the first unit, and f3 is a focal length of the third unit.

10. The optical system according to claim 1, wherein the following inequality is satisfied:

$$0.3 < (f2 - f1)/f3 < 7.0$$

where f1 is a focal length of the first unit, f2 is a focal length of the second unit, and f3 is a focal length of the third unit.

11. The optical system according to claim 1, wherein the following inequality is satisfied:

$$0.5 < f3/f < 4.0$$

where f3 is a focal length of the third unit, and f is a focal length of the optical system.

12. The optical system according to claim 1, wherein the following inequality is satisfied:

$$0.5 < L/f < 3.5$$

where L is a distance on an optical axis from a surface on the image side of the third lens to an image plane.

13. The optical system according to claim 1, wherein the following inequality is satisfied:

$$-2.0 < da1 \times f1/(f \times Yim) < -0.3$$

where da1 is a distance from a lens surface closest to an image plane of a lens in the first unit to an aperture stop, f1 is a focal length of the first unit, f is a focal length of the optical system, and Yim is a maximum image height.

14. The optical system according to claim 1, wherein no lens is formed on one surface of the first substrate.

15. The optical system according to claim 1, wherein no lens is formed on one of surface of the second substrate.

16. The optical system according to claim 1, wherein no lens is formed on one surface of the third substrate.

17. The optical system according to claim 1, wherein materials of the first substrate and the first lens are different from each other.

18. The optical system according to claim 1, wherein materials of the second substrate and the second lens are different from each other.

19. The optical system according to claim 1, wherein materials of the third substrate and the third lens are different from each other.

20. An image pickup apparatus comprising:
an optical system; and
an image sensor configured to receive an image formed by the optical system,
wherein the optical system includes a plurality of units, the plurality of units consisting of, in order from an object side to an image side, a first unit, a second unit, and a third unit,
wherein the first unit includes a first substrate and a first lens having negative refractive power, the first lens being disposed on the image side of the first substrate,
wherein the second unit includes a second substrate and a second lens having positive refractive power, the second lens being disposed on the object side or image side of the second substrate,
wherein the third unit includes a third substrate and a third lens having positive refractive power, the third lens being disposed on the object side or image side of the third substrate,
wherein at least one of the first lens, the second lens, and the third lens constitutes a cemented lens including a fourth lens, and
wherein the fourth lens and the lens cemented with the fourth lens in the cemented lens have refractive powers different from each other and Abbe numbers different from each other.

* * * * *